United States Patent

Mueller et al.

[11] Patent Number: 5,835,452
[45] Date of Patent: Nov. 10, 1998

[54] REFLECTED SHEAR WAVE SEISMIC PROCESSES

[75] Inventors: Michael C. Mueller; Leon Thomsen, both of Houston, Tex.; Ilya Tsvankin, Lakewood, Colo.

[73] Assignee: Amoco Corporation, Chicago, Ill.

[21] Appl. No.: 540,174

[22] Filed: Oct. 6, 1995

[51] Int. Cl.[6] .................................................... G01V 1/28
[52] U.S. Cl. ............................................. 367/75; 364/421
[58] Field of Search ................................. 367/38, 47, 75; 364/421

[56] References Cited

U.S. PATENT DOCUMENTS

| | | | |
|---|---|---|---|
| 4,817,061 | 3/1989 | Alford et al. | 367/75 |
| 4,933,913 | 6/1990 | Thomsen | 367/75 |
| 5,060,203 | 10/1991 | Winterstein | 367/75 |
| 5,060,204 | 10/1991 | Winterstein | 367/75 |
| 5,343,441 | 8/1994 | Alford | 367/75 |
| 5,398,215 | 3/1995 | Sinha et al. | 367/31 |
| 5,508,973 | 4/1996 | Mallick et al. | 367/38 |

OTHER PUBLICATIONS

Winterstein et al., "Shear–wave polarizations and subsurface stress directions at Lost Hills field", Geophysics, Vo. 56, No. 9, pp. 1337–1339, Sep. 1991.

Mueller, M.C., "Using Shear waves to predict lateral variability in vertical fracture intensity", The Leading Edge, vol. 11, pp. 29–35 1992.

Slack et al, "Thin layers and shear–wave splitting", Geophysics, vol. 58, No. 10, pp. 1468–1480 Oct. 1993.

Thomsen, L., "Reflection seismology over azimuthally anisotropic media", Geophysics, vol. 53, No. 3, pp. 304–313 Mar. 1988.

*Primary Examiner*—Ian J. Lobo
*Attorney, Agent, or Firm*—James A. Gabala; Robert E. Sloat

[57] ABSTRACT

A method for measuring and using anisotropy in a coal bed sequence. The method includes the steps of: stripping layers where polarization changes are indicated by applying a static shift to components aligned with the slow shear wave polarization direction and applying one half of the static shift to components neither aligned with the slow shear wave polarization direction nor aligned with the fast shear wave polarization direction; obtaining for a coal bed a measure of the amplitude of the envelope of the fast polarization trace; rotating, by about 45 degrees away from a principal direction, the data set for that coal bed; obtaining a measure of the amplitude of the envelope of at least one of the mixed/mismatched polarization traces of that coal bed; and obtaining the ratio of the amplitude of the envelope of the fast polarization trace to the amplitude of the envelope of one mixed/mismatched polarization trace in that coal bed.

51 Claims, 5 Drawing Sheets

REFLECTED SHEAR WAVE SEISMIC PROCESSES

TECHNICAL FIELD

This invention relates to the general subject of oil and gas exploration and, in particular to seismic exploration methods and processes using surface reflected shear waves over anisotropic layers.

BACKGROUND OF THE INVENTION

It has become increasingly important to identify and develop coalbed methane reserves. To this end tools are needed that can assist in pre-drilling identification of coal seams, thickness, geometry, lithology, structure and fracturing. Prior drilling, mining and other geological studies can provide this information at specific local sites; however, concession acreage often extends well beyond the available mining and corehole localities. Additionally, the potential for rapid lateral variation in these coal parameters implies that these conventional data may well be too sparsely spaced to provide an adequate picture of the concession's coal resources (See Henson, Jr., H. and J. L. Sexton, "Pre-mine study of shallow coal seams using high-resolution seismic reflection methods", Geophysics, 56, (9), pp. 1494–1503, 1991).

Seismic coverage can play an important role in revealing local detail. Compressional wave seismic data has been utilized by the mining industry to provide information on seam occurrence, thicknesses, geometries and structure to guide mining activities (See Gochioco, L. M. and S. A. Cotten, "Locating faults in underground coal mines using high-resolution seismic reflection techniques", Geophysics, 54, (12), pp. 1521–1527, 1989; Gochioco, L. M., "Tuning effect and interference reflections from thin beds and coal seams", Geophysics, 56, (8), pp. 1288–1295, 1991; and Gochioco, L. M., "Modeling studies of interference reflections in thin-layered media bounded by coal seams", Geophysics, 57, (9), pp. 1209–1216, 1992; Poole, G., G. Duncan, L. Leung, "Offset Vertical Seismic Profiling Surveys for Coal Exploration", SEG 1991 Exp. Abs., pp. 562–563; and Urosevic, M., B. J. Evans, and P. J. Hatherly, "Application of 3-D Seismic Methods to Detection of Subtle Faults in Coal Seams", SEG 1992 Exg. Abs., pp. 254–256). Often in mining, the intent is to avoid well-cleated and well-fractured coal in order to minimize coalbed methane seepage into mines and to enhance the safety of longwall operations. By contrast, production of coalbed methane via the borehole benefits from high cleat and fracture content (See Ting, F. T. C., "Origin and Spacing of Cleats in Coal Beds", Journal of Pressure Vessel Technology, pp. 624–626, 1977; Ayoub, J., L. Colson, D. Johnston, J. Levine, "Learning to Produce Coalbed Methane", Oilfield Review, pp. 27–40, 1991); Gash, B. W., "Measurement of 'Rock Properties' in Coal for Coalbed Methane Production", SPE 22909, 1991, pp. 221–230; and Gash, B. W., R. F. Volz,. and J. M. Corgan, "The Effects of Cleat Orientation and Confining Pressure on Cleat Porosity, Permeability and Relative Permeability in Coal", Proceedings of the 1993 International Coalbed Methane Symposium, May 17–21, 1993, pp. 247–255.). Since the presence of cleating and fracturing is desired, tools that can identify these remotely, prior to drilling, would enhance the potential to optimize economic development of coalbed methane resources.

Shear-wave methods for the identification of fracturing and fractured "sweet spots" have been developed (See Thomsen, L., "Reflection Seismology over Azimuthally Anisotropic Media", Geoph., 53, (3), pp. 304–313, 1988; and Alford, R. M., "Shear Data in the Presence of Azimuthal Anisotropy", SEG Convention Expanded Abstracts, pp. 476–479, 1986) and applied (See Mueller, M. C., "Prediction of Lateral Variability in Fracture Intensity Using Multicomponent Shear Wave Surface Seismic as a Precursor to Horizontal Drilling", Geoph. J. Intl., 107, (3), pp. 387–408, 1991.) by the inventors for use in fractured carbonates and clastics.

The principle challenges in extending these original techniques relate to three properties of coals; they are:
- their thin-bed character (relative to typical seismic wavelengths);
- their extremely low acoustic impedances (which give rise to reflection coefficients as much as five times greater than those found in typical sedimentary sequences), and
- the fact that in zones of intense fracturing this impedance decreases even further, for the waves which are sensitive to the fractures.

These three characteristics combine when coal seams are vertically stacked in a coal bearing sequence (CBS), so that interbedded multiples can result in highly destructive interference of coal reflectors and render uninterpretable the seismic amplitudes within the CBS (See Pietsch, K. and R. Slusarczyk, "The Application of High-Resolution Seismics in Polish Coal Mining", Geophysics, 57, (1), pp. 171–180, 1992; Gochioco, L. M., "Tuning effect and interference reflections from thin beds and coal seams", Geophysics, 56, (8), pp. 1288–1295, 1991; and Gochioco, L. M., "Modeling studies of interference reflections in thin-layered media bounded by coal seams", Geophysics, 57, (9), pp. 1209–1216, 1992). Therefore, any extension of classical shear-wave rotation and amplitude techniques must be devised to accommodate these seismic challenges.

Moreover, the theory of crack-induced anisotropy is well-developed only for the special case of a single set of circular cracks. The crack-induced anisotropy for a single set of circular cracks, most commonly discussed in the literature, is given by, Hudson (See Hudson, J. A., "Overall Properties of a Cracked Solid", Math Proc. Camb. Phil. Soc., 88, p. 371, 1980). Thomsen (See Thomsen, L., "Elastic Anisotropy due to Aligned Cracks in Porous Rock", Eur. Assoc. Expl. Geoph. Convention Abstrs., 53, pp. 244–245, (1991); paper published and revised in Geophysical Prospecting, 43, pp. 805–829 1995) has showed that, if the cracks are imbedded in a porous rock (as opposed to a solid), then that porosity contributes to the anisotropy, even though (by definition) there is no preferred orientation to it. This happens because of fluid pressure equalization, at seismic frequencies, between the fluid in the cracks and the pores. This generalization was confirmed experimentally by Rathore et al. (See Rathore, J. S., Fjaer, E., Holt, R. M., Renlie, L., "P- and S-wave Anisotropy of a Synthetic Sandstone with Controlled Crack Geometry", Geoph. Prospctng, 43, pp. 711–728, 1995).

Thus, the current understanding of crack-induced anisotropy is clearly inadequate and needs to be extended, at least to orthogonal sets of cracks which are long (horizontally) and short (vertically).

Direct detection of the fractured sweet spots is believed to be preferable to indirect detection. An introduction to the subject of direct detection of azimuthal anisotropy by analyzing the polarization directions of seismic shear waves is given by Thomsen (See Thomsen, L., Reflection Seismology over Azimuthally Anisotropic Media, Geoph., 53, (3), pp. 304–313, 1988, and references cited therein). Indirect detection of fractures (e.g., by the location, using conventional P-wave methods, of nearby subsurface structures and the assumption that these must cause fracturing) is inherently less satisfactory. Of course, such direct detection depends upon the detection of the azimuthal anisotropy caused by the fractures. However, direct detection of azimuthal anisotropy using P-waves has not been historically successful in other fracture plays (e.g., the Austin Chalk); therefore, one would not be optimistic that it would prove successful in the CBS context.

Since most rocks are azimuthally anisotropic, then, in general, vertically-traveling shear waves will not propagate with the polarization established by the source. Instead, they will vectorially decompose into two vertically-traveling waves, polarized mutually orthogonally (to a good approximation), and traveling at different speeds. In general, neither of these waves is polarized either cross-line or in-line; rather, they are both polarized in special directions determined by the rock, not by the source. (Those skilled in the art will appreciate that "SH" and "SV" waves rarely exist in nature; they exist mainly in textbooks!)

In the simplest case (where the azimuthal anisotropy is caused by a single set of vertical cracks or cleats in an otherwise isotropic matrix), the two special polarization directions of vertically-travelling waves are along the cracks, and perpendicular to them. Of course, both are transverse to the ray (approximately) and each travels with a different speed, hence the shear wave splits. The anisotropy (i.e., the difference in velocity according to direction, polarization direction in this case) may be defined as:

$$\gamma = \frac{V^{\parallel} - V^{\perp}}{V^{\perp}} \quad (1)$$

(i.e., the fractional difference between vertically-traveling shear waves polarized parallel ($\parallel$) and perpendicular ($\perp$) to the implied fractures). Since $V^{\parallel}$ is greater than $V^{195}$, $\gamma$ is positive. This notation is chosen to be consistent with Thomsen (See Thomsen, L., "Weak Elastic Anisotropy", Geoph., 51, (10), pp. 1954–1966, 1986).

The two waves propagate down independently, reflect off some interface (here assumed horizontal), and return to the surface, where both can be recorded. In general, a cross-line receiver will record both arrivals; the same is true for an in-line receiver. This happens, in general, whether the source is oriented in-line or cross-line; the source orientation affects only the relative excitation of the two modes, which depends upon the trigonometric factors of vector decomposition.

Conventional multi-source/multi-receiver (MS/MR) acquisition (with in-line and cross-line sources, in-line and cross-line receivers) results in four traces which comprise a 2 by 2 tensor S with time-dependent components. Choosing "x" as the in-line direction (which seems natural since one normally draws x-z cross-sections), and "y" as the cross-line direction, and indexing these in the conventional way (x, y)=(1, 2), then the trace with in-line source, in-line receiver is denoted $s_{11}(t)$. The cross-line—cross-line trace is then $s_{22}(t)$, and the traces with mis-matched source and receiver, $s_{12}(t)$ and $s_{21}(t)$, lay off the diagonal.

In general, if the delay between the two shear modes is non-negligible, but less than the duration of the wavelet, then complicated interferences (between the two modes) will occur on each of these four traces, rendering them difficult to interpret. However, in the special case where the source is aligned with one of the two special directions of the rock, only one wave is excited. For example, if the in-line source happens to be parallel to the "fast" direction, then only the "fast" mode is excited; it is then recorded on the in-line receiver while the mis-matched receiver receives nothing. The other mode is excited only by the cross-line source and received only by the cross-line receiver.

Since the (usually uninterpretable) set of four observed traces $s_{ij}$ is a tensor, it can be rotated, via a tensor rotation operation, to refer to new coordinate axes which are aligned with the special directions of the rock, as above. Alford (See Alford, R. M., "Shear Data in the Presence of Azimuthal Anisotropy", SEG Convention Expanded Abstracts, pp. 476–479, (1986) and U.S. Pat. Nos.: 4,817,061; 4,803,666; 5,029,146 and 4,903,244) showed that, through application of the MS/MR rotation technique which now bears his name, one may calculate (from four uninterpretable traces):

* One "fast" trace (labelled 22 in FIG. 1), recording a shear wave which is unaffected by the cracks (in the simple case of one set of vertical, parallel cracks);
* One "slow" trace (labelled 11 in FIG. 1), recording a shear wave strongly affected by the cracks; and
* Two traces (labelled 12 and 21 in FIG. 1) which are approximately null. Thomsen (See Thomsen, L., Reflection Seismology over Azimuthally Anisotropic Media, Geoph., 5, (3), pp. 304–313, 1988) disclosed a vector rotation method. Thomsen gave a derivation of the basic Alford process and an alternative process which employs only one polarization of source (i.e., a single-source/multi-receiver, SS/MR technique; also see U.S. Pat. Nos. 4,888,743 and 4,933,913).

These rotation methods assume that there is only a single orientation of anisotropic axes throughout all depths down to the reflector (possibly excepting a few thin layers). This implies that the shear modes split only once. Vertical propagation is assumed, yet it is typically applied to stacked traces. This requires the further assumption that such a stacked trace is an appropriate approximation to a noise-reduced, vertical-incidence trace. The conditions under which this may be true are not well understood.

Nonetheless, Willis (See Willis, H. A., Rethford, G. L., Bielanski, E., "Azimuthal Anisotropy—The Occurrence and Effect on Shear Wave Data Quality", SEG 1986 Exp. Abs., p. 479, 1986.) showed that it is commonly possible to find a single rotation angle $\theta$ (not depth-variable), with an uncertainty of ±10° or so, which accomplishes the above result. Typically, the four-component data set, as acquired (i.e., in-line, cross-line sources/in-line, cross-line receivers), is rotated with different rotation angles (e.g., $\theta$=15°, 30°, 45°, 60°, 75°, etc.) and that angle is selected which best minimizes the off-diagonal components after rotation. Automated procedures are preferred, but not really needed.

The two resulting (i.e., rotated) diagonal traces (the "principal traces") are then commonly as easy to interpret as P-wave traces, (i.e., they commonly show good reflector continuity, even at great depths). In conjunction with good P-wave data, this permits the classical program for shear waves (e.g., lithology discrimination, bright-spot interpretation, etc.) to proceed. In addition, comparison between the two traces commonly reveals a small, time-variable delay between corresponding reflectors. The increase in the delay, over a coarse interval, gives a measure of the average anisotropy in that coarse interval, hence a measure of the fracturing in the interval.

Thus, it may be said that, after rotation, either diagonal trace allows one to look past the fractures to image the structures and to use the shear data for "classical purposes." On the other hand, the difference between the two diagonal traces allows one to look at the fractures. This difference (the increase in the delay time between corresponding reflectors) provides a measure of anisotropy (hence, fractures) which necessarily has poor spatial resolution.

FIG. 1 shows how such a method might work in a very thick (70 m) coal layer; the host rock is isotropic, γ=10%, and the line survey is perpendicular to the fractures of the coal. This, of course, is an unrealistic geometry, but the example illustrates the principal used previously (See Martin, M. and T. Davis, "Shear Wave Birefringence: A New Tool for Evaluating Fractured Reservoirs", *The Leading Edge*, 5 (10), pp. 22–28, 1987) to identify anisotropy in coarse layers. The first reflection event (at 0.25 sec) marks the top of the coal bed; it arrives at the same time on both principal traces lines 11 and 22 since these rays lie entirely in the clastic overburden (here assumed isotropic). The second event (the reflection from the bottom of the thick coalbed) arrives slightly earlier on the "fast" 22 trace, indicating that the coalbed is azimuthally anisotropic. Of course, the delay time Δt in msec depends upon the product of average anisotropy and the layer thickness (in msec); the same is true in the thin-bed sequences discussed below. In many applications, the anisotropy is much less than that used in the calculations relating to FIG. 1, and so the corresponding vertical resolution is much worse.

Thomsen (See Thomsen, L., Reflection Seismology over Azimuthally Anisotropic Media, *Geoph.*, 5, (3), pp. 304–313, 1988) proposed that the difference in normal-incidence amplitudes of split shear waves gives a highly-resolved measure of the jump in anisotropy (hence, fracture intensity differences) at the reflecting horizon. Thomsen's proposal was advanced, despite the well-known unreliability of amplitudes (as opposed to arrival times), because the general success of the traveltime methods proved (through "rotation") that the amplitudes of the various components do indeed have meaning in relation to each other, although none of the absolute amplitudes has meaning in itself. Thomsen's suggestion was confirmed by Mueller (See Mueller, M. C., "Prediction of Lateral Variability in Fracture Intensity Using Multicomponent Shear Wave Surface Seismic as a Precursor to Horizontal Drilling", *Geoph. J. Intl.*, 107, (3), pp. 387–408, 1991), who found that, in the Austin Chalk of central Texas, the patches of high intensity of fracturing were identifiable as dim spots on the slow-polarization section.

Thomsen's proposal, in its simplest form, is based on the reflectivity for normally incident shear waves. Considering a vertically-fractured reflecting rock (subscript 2) underlying an unfractured incidence rock (subscript 1), the reflection coefficient for the fast mode (polarized ∥ to the fractures) is:

$$R_\| = -\frac{\rho_2 V_2^\| - \rho_1 V_1}{\rho_2 V_2^\| + \rho_1 V_1} \qquad (2)$$

The shear velocity $V_2^\|$ (of the fast shear wave, polarized parallel to the fractures) is not affected by the cracks; hence, for the Austin Chalk example, $V_2^\|$ is a larger number than $V_1$, the shear velocity of the overlying shale. Also, in this context, $\rho_2 > \rho_1$. Hence, in Mueller's confirmation (see Mueller, M. C., "Prediction of Lateral Variability in Fracture Intensity Using Multi-component Shear Wave Surface Seismic as a Precursor to Horizontal Drilling", *Geoph. J. Intl.*, 107, (3), pp. 387–408, 1991), $R_\|$ was a large (negative) number. The leading minus sign in equation (2) arises because of the convention on the sign of the shear displacements (also see Aki, K. and P. G. Richards, *Quantitative Seismology: Theory and Methods*, W. H. Freeman & Co., San Francisco, 1980).

Similarly, the reflection coefficient for the slow mode (polarized ⊥ to the fractures) is:

$$R_\perp = -\frac{\rho_2 V_2^\perp - \rho_1 V_1}{\rho_2 V_2^\perp + \rho_1 V_1} = R_\| + \gamma/2 \qquad (3)$$

where γ is the shear-wave anisotropy. The shear velocity $V_2^\perp$ is less than $V_2^\|$ because of the cracks and, hence, $V_2^\perp$ is closer to the shale velocity $V_1$ (e.g., Mueller's Austin Chalk case study cited above). Hence, the absolute value of $R_\perp$ is smaller (i.e., less negative) in those places where the cracks are intense. If γ is on the order of 10%, and $R_\|$ is about 5%, then $R_\perp$ is about zero (i.e., about a 100% reduction). The resulting "dim spots" in the slow (⊥) section identified, for Mueller, sweet spots of intense fracturing, which were subsequently confirmed by horizontal drilling.

In addition, thin-bedded coals encased in clastic sedimentary rocks present a special situation not previously addressed. Neither the traveltime method nor the reflection amplitude method are completely satisfactory. The traveltime method is disappointing because the thin-bedded geometry often results in complicated interferences between short-delay reverberations within the coalbed sequence, so that, except for some anomalous CBS's, neither the top nor bottom reflections is clean. Hence, the accumulated time delay across the sequence may not be measured reliably. The reflection amplitude method fails because of the thin-bed geometry, and also because, among other things, the unfractured reservoir velocity for coal is less than the shear velocity of the roof rock.

Hence, there is a need to find a seismic signature for detecting the zones of enhanced azimuthal anisotropy (hence of enhanced fracturing) in thin-bedded coal sequences, encased and interbedded with faster sedimentary clastics. That signature should be independent of the details of the thin-bedded geometry and should not rely on well-defined reflections from thick coal layers. Moreover, it should recognize the complex nature of the coda of internal multiples within the coal bed sequence.

SUMMARY OF THE INVENTION

A general object of the invention is to provide a process and method for using surface reflected shear-wave signatures from a coal bearing sequence (CBS);

Yet another object of the invention is to provide a process and method for using the anisotropic properties of a coal bearing sequence to identify zones of natural fracturing;

One object of the invention is to identify a parameter that can be used to characterize CBS anisotropy, that is sensitive to the amount of anisotropy in the coal, that is sensitive to the fraction of anisotropic material within the coalbed sequence, that is sensitive to the thickness of the anisotropic beds, and that is practically independent of the details of the geometry;

Another object of the invention is to provide a process and method for identifying and characterizing fractures in the sub-surface, in general, and sweet spots in coalbed methane prospects, in particular;

Still another object of the invention is to provide a method for compensating for the anisotropy in the overburden of a CBS; and One specific object of the invention is to show how the properties of coals and the geometry of their occurrence in a coal bearing sequence affect shear-wave signatures and how a model of those signatures leads to a process for compensating for the anisotropy in the overburden of the coal bearing sequence and for detecting and evaluating location of cleats.

In accordance with the present invention a method is provided for processing surface reflected data over depth-variable azimuthally anisotropic layers of the earth. In one embodiment of the invention, the method comprises the steps of: acquiring a shear wave data stack from a set of multiple-sources and multiple-receivers; rotating each trace of the shear wave data stack by asingle angle corresponding to the difference in the orientation of the data stack and the direction of azimuthal anisotropy of the shallowest layer; localizing the vertical variation in the direction of anisotropy in the shallowest layer; measuring the degree of azimuthal anisotropy of the shallowest layer; performing layer-stripping of the data stack to obtain the principal time series of the shallowest layer, wherein layer-stripping includes the step of correcting the slow polarization traces of the data stack and the mixed polarization traces of the data stack for azimuthal anisotropy; repeating these steps for a layer under the shallowest layer; and rotating the data set thereformed by a single angle that corresponds to the difference in the direction of azimuthal anisotropy of the underlying layer and the direction of azimuthal anisotropy of the shallowest layer to identify the principle directions of the azimuthal anisotropy in the underlying layer.

In one particular implementation of the invention the stripping process includes the steps of identifying data components aligned with a slow shear wave polarization direction, data components aligned with a fast shear wave polarization direction and mis-matched data components that are neither aligned with the slow shear wave polarization direction or the fast shear wave polarization direction, determining the apparent time lags between the fast shear wave traces and the slow shear wave traces, determining the natural polarization directions of the fast shear wave traces and the slow shear wave traces, applying a static shift to data components aligned with the slow shear wave polarization direction; applying about one-half of said static shift to components neither aligned with the slow shear wave polarization direction nor aligned with the fast shear wave polarization direction to correct for azimuthal anisotropy in the overburden; and muting the components of the data set for times less than the bottom of a layer.

In accordance with the present invention a method is also disclosed for measuring or evaluating anisotropy in the sub-surface, such as in a sequence of coal beds. In one particular implementation of the invention the method. comprises the steps of: acquiring a multi-component surface reflected seismic. shear wave data set over the coal bed sequence; rotating, by an azimuth angle determined down to the shallowest depth where polarization changes are indicated above a coal bed, all of the data of said data set that are below the shallowest depth where polarization changes are indicated to establish a principle direction of anisotropy in the coal bed; rotating, by about 45 degrees away from said principle direction of anisotropy in that coal bed, all of the data of the data set that are below the shallowest depth where polarization changes are indicated; and obtaining a measure of the average of the amplitude of the envelope of at least one of the mixed/mismatched polarization traces of the rotated data.

In one particular implementation of the invention a method is disclosed for measuring anisotropy in a carbonaceous sequence. That method comprises the steps of: stripping layers where polarization changes are indicated by applying a static shift to components aligned with the slow shear wave polarization direction and by applying one half of said static shift to components neither aligned with the slow shear wave polarization direction nor aligned with the fast shear wave polarization direction; and rotating the principal time series data set by a single angle that corresponds to the difference in the direction of azimuthal anisotropy of the shallowest layer and the direction of azimuthal anisotropy of a subsequent layer. Thereafter, the process of the invention may include the additional steps of obtaining a measure of the amplitude of the envelope of the fast polarization trace; rotating, by 45 degrees away from a principal direction, the data set; obtaining a measure of the amplitude of the envelope of at least one of the mixed/mismatched polarization traces; and obtaining the ratio of the average of the amplitude of the envelope of the fast polarization trace to the amplitude of the envelope of one mixed/mismatched polarization trace.

The situation (i.e., thin-bedded coals encased in clastic sedimentary rocks) addressed by the present invention is different from and an improvement over two well known previous methods (i.e., traveltime method and reflection amplitude method). The traveltime method is not completely satisfactory because the thin-bed geometry often results in complicated interferences between short-delay reverberations ("peg-leg multiples") within the coalbed sequence, so that neither the top nor bottom reflections is clean, in general (although they may be clean in some anomalous CBS's). Hence, the accumulated time delay across the sequence may not be measured reliably. The reflection amplitude method fails because of the thin-bed geometry, and also because, in this case, the unfractured reservoir velocity for coal is less than that of the roof rock. Also, in equation (2) $\rho_2 < \rho_1$, so that $R_\parallel$ is large and positive. For the $\perp$-polarization, $V_2^\perp$ is even smaller, so that $R_\perp$ is even larger than $R_\parallel$. Thus, the fractured sweet spots result in bright spots on the slow $\perp$-section rather than dim spots. Further, since the unfractured (i.e., intrinsic) reflection coefficient is so large ($R_\parallel$ is about 50% in FIG. 1), a small value of $\gamma$ does not change the amplitudes in a remarkable way, but only in a quantitative way. This effect is clear in FIG. 1, where the top reflector has a very similar amplitude for both polarizations.

Numerous other advantages and features of the present invention will become readily apparent from the following detailed description of the invention, the embodiments described therein, from the claims, and from the accompanying drawings.

Figure 1:
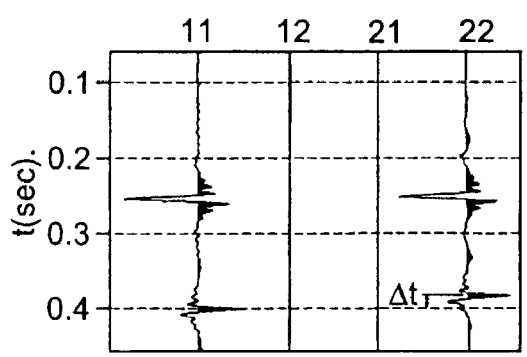
FIG. 1 is an example of four-part multi-source/multi-receiver (MS/MR) data acquisition from a fractured coalbed in isotropic host rock.

FIG. A of Appendix C is a schematic drawing illustrating two layers of the earth having vertical aligned cracks; and FIG. B of Appendix C is a schematic drawing illustrating the layers of FIG. A after processing in accordance with the present invention.

DETAILED DESCRIPTION

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment illustrated.

Figure 2:
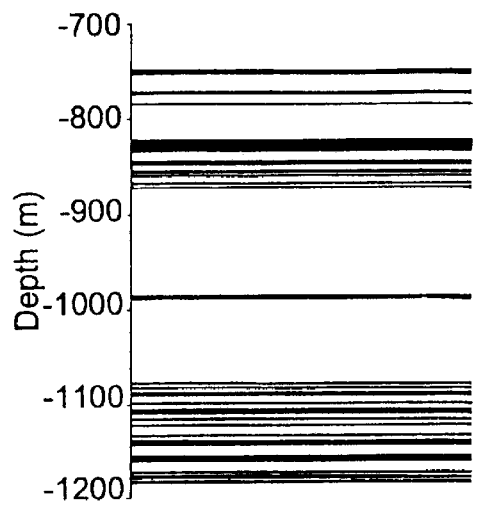
FIG. 2 is an illustration of the geometry of a coalbed sequence for the Narellan model.
Figure 6:
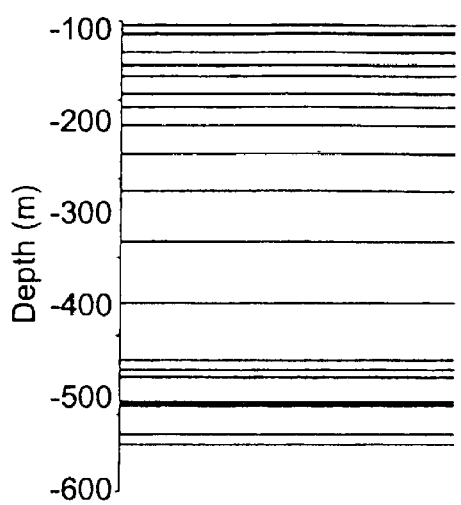
FIG. 6 is an illustration of the geometry of a coalbed sequence for the Silesian model.
Figure 8:
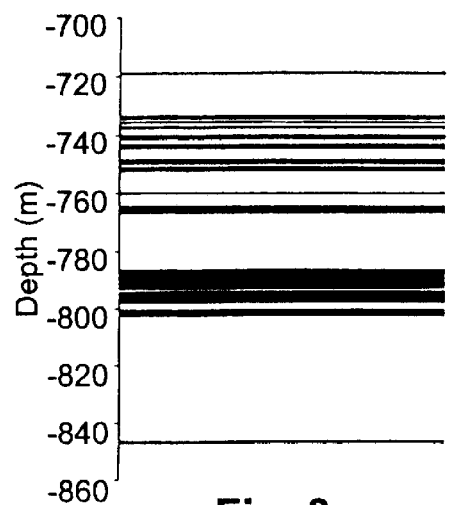
FIG. 8 is an illustration of the geometry of a coalbed sequence for the San Juan model.

Turning to FIG. 2, the geometry of the coal beds there depicted approximates the 40 thickest coat beds of a Narellan corehole site in New South Wales (NSW), Australia. The top-most coal underlies about 3000 feet of shales and sandstones. Other places in this basin and other basins of interest (e.g., San Juan, Silesia) have different coalbed geometries (see FIGS. 6 and 8).

Figure 3:
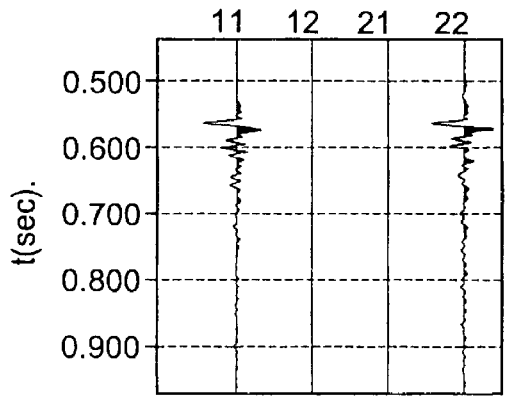
FIG. 3 illustrates a four-part data set acquired along the principal axes of anisotropy in the coal of the Narellan model of FIG. 2.

For a MS/MR shear line acquired in a direction perpendicular to the principal fracture set of the coal bed sequence of FIG. 2, the resulting four-part data set is depicted (vertical propagation only!) in FIG. 3. An isotropic overburden is assumed with γ=20% and the X-axis located perpendicular to the fractures in the coal. The fast polarization trace 22 reflection off the top portions of the coalbed sequence (near 0.5 sec) is followed by a complicated coda of reverberations from within the coalbed sequence, with no clear reflection from the bottom of the sequence. There are complicated reverberations within the CBS, but all of them have the same polarization, in this context. The corresponding slow polarization trace 11 reflection arrives at the same time (since in this model the overburden is isotropic), and again is followed by a complicated coda (different in its details). The mis-matched traces 12 and 21 are both null in this special acquisition circumstance, as above. If there were no fractures at all, the traces would be similar to these, regardless of the direction of the line and the two traces shown would be identical, rather than just similar.

Figure 4:
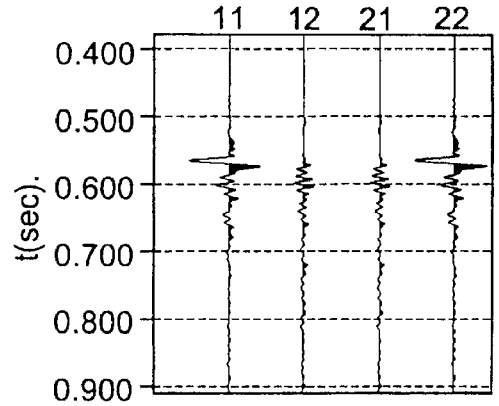
FIG. 4 illustrates a four-part data set acquired along a line at 45° to the principal fracture strike in the coal of the Narellan model of FIG. 2.

The same acquisition along a line at 45° to the principal fracture strike is shown in FIG. 4. The in-line/in-line traces 11 contain contributions from both the fast mode and the slow mode, and the signal is even more complicated than in FIG. 3. The same comments describe the cross-line/cross-line traces 22. To the eye, the most remarkable difference between FIGS. 3 and 4 is the strong signal on the mis-matched traces, which is comparable in overall amplitude to the signals on the diagonal traces. This occurs because both fast and slow modes reverberate within the coalbed sequence, but their different velocities put these reverberations out of phase with each other. Because of the out-of-phase reverberations, the mis-matched vector components do not automatically cancel each other out, and the result is a strong resultant signal. For this orientation of line, both modes have polarization vectors with components both in-line and cross-line, and so both show up on the mis-matched traces.

In a different context, Alford (See Alford, R. M., Shear Data in the Presence of Azimuthal Anisotropy, *SEG Convention Expanded Abstracts*. (1986) pp. 476–479) pointed out that significant energy on the mis-matched traces of an MS/MR data-set was a sensitive indicator of azimuthal anisotropy. In that case, the anisotropy indicated was in the overburden. Here, the overburden is isotropic; the indicated anisotropy is within the coalbed sequence. It follows that the magnitude of the energy on these mis-matched traces is a measure of the degree of anisotropy with the sequence, hence a measure of the fracture intensity.

Of course, it is not necessary to actually acquire this data along a line at 45° to the (initially unknown) fracture strike. One may acquire it along any line of convenience and rotate it numerically to find that angle which yields the best approximation to FIG. 3. This procedure establishes the direction of fracture strike relative to the map coordinates. A subsequent rotation by 45° yields the equivalent of FIG. 4, wherein the amplitude on the mis-matched traces yields a measure of fracture intensity. One may expect that the fracture intensity would vary from place to place, so this provides a measure, a seismic signature, or diagnostic for exploring directly for fractured sweet spots. In particular, the amplitude of the envelope of the mis-matched traces 12 or 21 (at 45°) is claimed to be a good integral measure of the average anisotropy (and thickness) of the coals in the sequence. This mis-matched trace is a direct function of the difference between the principal traces 11 and 22 (See FIG. 3) acquired along the principal axes of anisotropy. In the absence of azimuthal anisotropy, the principal traces would be identical, and the mis-matched trace for a 45° orientation would be null. To define a dimensionless measure of average CBS anisotropy, the amplitude of the envelope of a mis-matched trace $A_{12}(45°)$ or $A_{21}(45°)$, which is entirely dependent upon the presence of the azimuthal anisotropy (See FIG. 4), is normalized by the amplitude of the envelope of the fast trace $A_{22}(0°)$ taken at the optimum orientation (which is entirely independent of such anisotropy, but does depend on the thin-bed geometry, etc.):

$$R_a = \frac{A_{12}(45°)}{A_{22}(0°)} \qquad (4)$$

Of course, the amplitudes are averaged over the CBS window. Wherever $R_a$ is large, the interpretation would be that this represents a patch of high anisotropy (hence of intense fracturing) or of coal thickness, or both.

Modeling Results

Application of shear wave seismics to fracture detection in coals represents a new adaptation of split shear wave technology. Although the method outlined above is based on physical principles verified in the field, numerical modeling can give some insight into the intensity of the effect, its relation to the fracture density in coals, and possible distortions caused by the overburden.

In the discussion which follows synthetic shear wave reflections are presented from coalbed sequences typical of the Sydney, Silesian, and San Juan Basins. The models were fashioned from existing sonic and density logs. While the logs provide the geometry of the sequence, as well as the densities and vertical P-wave and S-wave velocities, the parameters of fracture systems in coals are much more difficult to quantify. Throughgoing fractures (large cleats), which are mostly responsible for permeability in coal beds, are too large to be characterized by measurements on core samples, so the fracture properties used in the modeling must be assumed.

For this modeling it was assumed that anisotropy in coals is caused by a single system of parallel vertical fractures which have the same orientation in all coal beds. The complications caused by the second system of cleats commonly existing in coals will be ignored. The implications of this assumption will be examined.

Another effect neglected in the modeling is that of thin horizontal stratification, which leads (in the absence of fracturing) to an effective transversely-isotropic medium with a vertical axis of symmetry (Vertical Transverse Isotropy, or VTI) at seismic frequencies. The presence of VTI can be legitimately ignored for vertically-travelling shear waves, but it may become more important at oblique incidence.

In most of the examples, the overburden is modeled as a uniform isotropic layer. However, a model with an azimuthally anisotropic overburden (perhaps oriented differently) is considered, and a means is provided for correcting for the influence of such an overburden on shear wave reflections.

It is well known that a single set of parallel fractures in a purely isotropic matrix makes the medium transversely isotropic, with symmetry axis perpendicular to the fracture planes. In the present case of vertical fractures, the axis of symmetry is horizontal (Horizontal Transverse Isotropy, or HTI). A homogeneous, transversely isotropic medium can be fully described by its density, and the five elastic parameters introduced by Thomsen (See Thomsen, L., "Weak Elastic Anisotropy", Geoph., 51, (10), pp. 1954–1966, 1986):

* the velocities $V_{p0}$ (for P-waves) and $V_{s0}$ (for S-waves) in the direction of the symmetry axis (horizontal in our case); and

* three dimensionless anisotropic coefficients ($\epsilon$, $\delta$, and $\gamma$).

The velocities and amplitudes of shear waves travelling vertically in this context depend mostly on two parameters: the S-wave velocity ($V_{s0}$) and the anisotropy parameter $\gamma$, which determines the degree of shear-splitting at vertical incidence (i.e., equation 1). It should be noted that in the elastic plane-wave approximation, the other three parameters do not affect vertically-travelling S-waves at all. For the more realistic case of point-source radiation, the $V_{p0}/V_{s0}$ ratio, and the coefficient $\epsilon$ and $\delta$ influence shear wave amplitudes through the shape of the slowness surfaces; nonetheless, these effects are considered to be of secondary significance. Therefore, the degree of the anisotropy in coals can be characterized by the parameter $\gamma$ (i.e., the phrase "20% anisotropy" means that $\gamma=0.2$, and so forth). Appendix A demonstrates that $\gamma$ is proportional to the value of fracture density.

The following parameters were used for the host rock and the coal, in all of models:

Host rock (sandstone): $V_p$=4.5 km/s, $V_s$=2.65 km/s, $\rho$=2.37 g/cm$^3$

Isotropic coal: $V_p$=2.3 km/s, $V_s$=1.045 km/s, $\rho$=1.39 g/cm$^3$

Anisotropic coal: $V_{p0}$=2.3 km/s; $V_{s0}$=883 km/s, $\rho$=1.39 g/cm$^3$;

$\gamma=0.2$; $\epsilon=0$; $\delta=-0.16$

Modeling was performed using a full-waveform code based on the reflectivity method (See Garmany,J., "Some Properties of Elastodynamic Eigensolutions in Stratified Media", Geoph. J.R.A.S., 78, 565–569, 1983). That code computes the reflection response (including all possible multiples and conversions) for a realistic point source located at the free surface. The results discussed below represent zero-offset reflections from a point horizontal force with different orientations. An Ormsby source wavelet, with corner frequencies 10, 20, 90, and 120 Hz was used. The reflections in FIG. 1 have a shape close to that of the source pulse. The accuracy of the reflectivity program was checked by running a finite-element code on one of the models. The results of the two methods turned out to be very similar, thereby verifying the accuracy of our methods.

The following discussion is mostly focused on the Narellan model (FIG. 2), which represents the geometry of the coal beds at one of the corehole sites in the Sydney Basin. Such modeling leads to the following conclusions:

1. The parameter $R_a$ is sensitive to the degree of anisotropy in the coalbed sequence. Referring to the Narellan model of FIG. 2 and keeping the geometry of the model and the parameters of the matrix intact, the degree of anisotropy (and, correspondingly, the fracture density) in the coal beds was changed. For small and moderate anisotropy, the parameter $R_a$ is virtually proportional to the anisotropy $\gamma$, reaching 23% for $\gamma=0.15$. Although for higher anisotropy, the curve starts to flatten out, $R_a$ is believed to be sensitive enough to the anisotropy (in the most important range $\gamma=0$ to 25%) to be an operationally useful measure of the anisotropy. There is no doubt that for $\gamma>0.1$ to 0.15, the value of $R_a$ exceeds the level of noise, and can be reliably measured in the field.

2. The parameter $R_a$ is quite sensitive to the amount of anisotropy in the coal, to the fraction of anisotropic material within the coalbed sequence, and to the thickness of the anisotropic beds, but is practically independent of the details of the geometry (i.e., the positions of the coal beds) of the coalbed sequence. The character of interference of the multiples is determined not only by the elastic parameters of the coals, but also by the geometry of the model. If the coal beds are very thin compared to the predominant wavelength and are very close to each other, the sequence behaves as a single homogeneous layer with the effective parameters determined by averaged elastic parameters of individual layers, independent of the details of the spacing. However, this "long-wavelength" limit is not reached by the models heretofore considered.

EXAMPLE I

To test the sensitivity of the parameter $R_a$ to the details of the layer-spacing, each coal bed in the Narellan model (FIG. 2) was moved by 1 m up or down (at random) without changing the thicknesses of the beds, nor their elastic parameters. Although the shape of each wavetrain changed, the parameter $R_a$ remained about the same (within 4%). Therefore, $R_a$ as a measure of anisotropy is practically independent of any fine details of the CBS geometry.

EXAMPLE II

In another test, the thicknesses of all coal beds (in the Narellan model with $\gamma=0.2$) were increased by 20%. The parameter $R_a$ for the new model went up to 40.5%, compared to 28.3% for the original model. This is not surprising, because an increase in the fraction of the anisotropic material leads to larger time delays between the fast and slow modes reverberating within the CBS. As a result, the amplitude of the mis-matched trace on a 45° line becomes higher (although the dependence of $R_a$ on the fraction of the anisotropic coal may not be smooth).

It is, of course, highly possible that the amount of anisotropy might vary for different coal beds within the CBS. The influence of these variations was checked by assuming $\gamma=5\%$ in all odd- numbered beds in the Narellan model (counted from the top—1,3,5, . . . ), and $\gamma=20\%$ in all even- numbered beds (2,4,6, . . . ). The value for Ra for such a model turned out to be 11%, which is much closer to the result for the uniform 5% anisotropy ($R_a=8.7\%$) than for the uniform 20% anisotropy ($R_a=28.3\%$). This is explained by the predominant influence of the first three coal beds (especially the first one, the Bulli layer) on the maximum amplitude of the mis-matched trace. In principle, it is possible to refine the proposed method by calculating the parameter $R_a$ in a moving time window to obtain a crude depth-dependent measure of anisotropy.

3. This technique can be applied to other areas. Models which represent the coalbed geometry as determined from borehole logs in the Silesian Basin in Poland, and in the San Juan Basin in Colorado and New Mexico have been investigated. The overburden in both models was assumed to be isotropic; the S-wave anisotropy in the coals was assumed to be 20%, for comparison.

Figure 7:
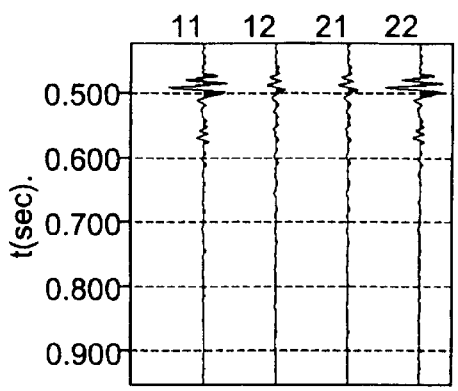
FIG. 7 illustrates a four-part data set acquired along an axis 45° to the fractures in the coal of the Silesian model of FIG. 6.

The shear wave signature for the Silesian model (FIGS. 6 and 7) is very similar to that for the Narellan model (See FIG. 2), with the parameter $R_a$ close to 30%. The major contribution to the mis-matched component is made by several coal beds near the top.

Figure 5:
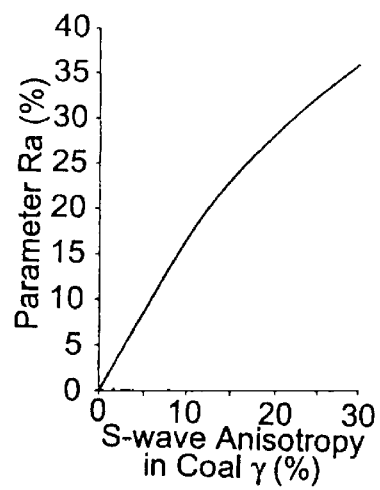
FIG. 5 depicts a calibration curve for the CBS characteristic of a particular area of interest.
Figure 9:
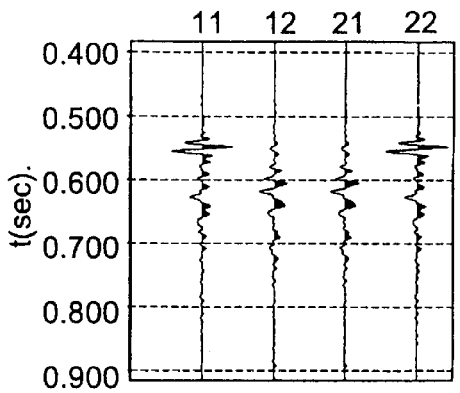
FIG. 9 illustrates a four-part data set acquired along an axis 45° to the fractures in the coal of the San Juan model of FIG. 8.

The San Juan model (FIGS. 8 and 9) is somewhat different from the first two models. It contains several relatively thick coal beds which cause low-frequency reflections in the "coda" wavetrain. Due to large time delays between the fast and slow modes in these thick layers, the contribution of the mis-matched component is relatively high. The parameter $R_a$ reaches 47%, compared to $R_a=28.3\%$ for the Narellan model with the same degree of anisotropy in the coalbeds. The maximum energy on the mis-matched trace is generated by the reflections from the thickest coal beds. This result confirms the observation that the value of $R_a$ depends not only on the degree of anisotropy, but also on the fraction of the anisotropic material within the CBS. Probably it is best, in doing quantitative work, to establish a calibration curve, similar to FIG. 5, for the CBS characteristic of any particular area.

4. The influence of anisotropy in the overburden can be corrected. The overburden in all of the previous examples was assumed to be purely isotropic. However, due to the ubiquity of azimuthal anisotropy in the upper crust (See Willis, H. A., Rethford, G. L., Bielanski, E., "Azimuthal Anisotropy—The Occurrence and Effect on Shear Wave Data Quality", *SEG 1986 Exp. Abs.*, p. 479, 1986), it is likely that the clastic layer above the CBS might also be lightly fractured, and that the direction of this fracture might be different from the cleat direction in the coals. The presence of azimuthal anisotropy in the overburden may significantly distort the shear wave signature of the CBS, and it deserves a separate discussion.

To begin, zero-offset reflections were calculated (FIG. 10) for the Narellan model from FIG. 2, but with a weakly anisotropic overburden. The parameter $\gamma$ for the overburden is 0.02, ten times less than in the coal beds ($\gamma=0.2$). Although the overburden anisotropy is weak, the accumulated delay time (at the top of the coal) is significant (i.e., about 10 milliseconds), because of its thickness.

Figure 10:
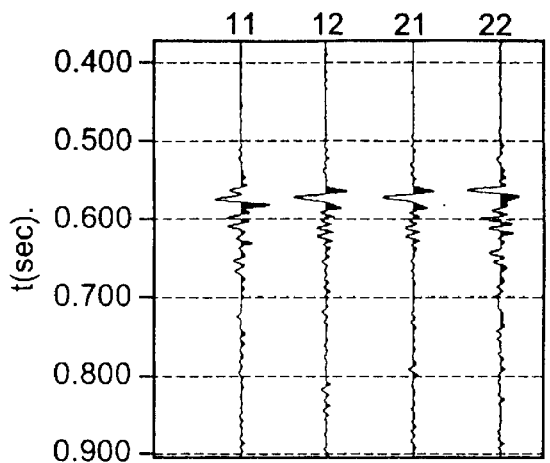
FIG. 10 illustrates zero-offset reflected synthetic data calculated for the Narellan model of FIG. 2, with a weakly anisotropic overburden and fractures oriented 30° to the fractures in the coal.

In this example, the direction of the fractures in the overburden is at 30° to the direction of the cleats in the coal. The synthetic data in FIG. 10 is acquired along the principal axes of anisotropy in the coal (the x axis is perpendicular to the cleats), as in FIG. 3. However, the mis-matched traces show a very strong signal, in the CBS time window, which did not exist on similar traces in FIG. 3, calculated for the model without anisotropy above the CBS. Clearly, this represents a problem for the previous analysis.

If the overburden is anisotropic, the incident S-wave splits into fast and slow modes polarized parallel and perpendicular (respectively) to the fractures in the overburden. At the top of the uppermost coal bed, both modes split again, this time into components polarized parallel and perpendicular to the fractures (cleats) in the coal. These four modes reverberate inside the CBS, giving rise to peg-leg multiples, and split again (on their way back to the surface) at the bottom of the overburden. The result is a very complicated wavefield, which reflects the influence of the fractures not only in the coal, but also in the overburden.

This picture simplifies significantly if the fractures in the coal and overburden have the same orientation. In this case, each of the split S-waves in the overburden generates only one S-wave in the coal (the one that has the same polarization), and the influence of the overburden is restricted to an additional time delay. However, this additional delay causes a non-zero signal on the mis-matched traces, even if the CBS is anisotropic, since the two waves are not in phase with each other. Hence, the simple procedure, described above, cannot be used without stripping the upper layer of its anisotropy. The end result of this analysis is that the effects of azimuthal anisotropy in the overburden should be taken in account. In the discussion which follows, it will be shown that the more general situation, with different fracture orientations in the overburden and CBS, is not especially more difficult. Since this layer-stripping process has broad application, even outside the CBM context, it is discussed separately, in the next section.

On the whole, this modeling shows that the seismic signature/parameter Ra, proposed as a diagnostic of fractured sweet spots, is indeed a good integral measure of anisotropy in coalbed sequences. While not sensitive to any fine details of the CBS geometry, the signature strongly depends not only on the degree of anisotropy in the coalbeds, but also on the fraction of the anisotropic material within the CBS.

Modeling Vertically Varying Anisotropy Directions

Winterstein and Meadows (See Winterstein, D. F. and M. A. Meadows, "Shear-Wave Polarizations and Subsurface Stress Directions at Lost Hills Field", *Geophysids*, 56, pp.1331–1348, 1991; and U.S. Pat. Nos. 5,060,203 and 5,060,204) have suggested a layer stripping technique as a way to unravel depth-variant fracture orientation in zero-offset VSP's. They believed that their VSP technique applies equally to the surface reflection context; however, they gave no examples. They explained that: signal-to-noise ratios are lower for surface reflection data; and, if the horizons where the anisotropy changes direction do not coincide precisely with strong reflectors, there is a failure in the assumptions of the technique, and a consequent loss of accuracy.

While these two observations are correct, since the time delay between the two split modes develops gradually with travel path (i.e., the delay does not occur instantly at the horizon where the anisotropy changes), exact coincidence (between horizons of anisotropy change and reflectors) is not required. Moreover, recent experience (See M. C. Mueller, "Interpretation of DipoleShear Anisotropy Log in a Thrust Belt Setting", *SEG Expanded Abstracts, pp.* 484–487, 1995) with dipole shear anisotropy logs suggests that horizons of anisotropy change can be poorly correlated with formation boundaries, even for methods of investigation with resolution at or below the scale of bedding. Such experience makes one optimistic that inexact coincidence is usually not a problem. Similarly, the signal-to-noise ratios in surface reflection data have not been found to be a serious problem (cf. T. A. Chaimov, G. J. Beaudoin, W. W. Haggard, and M. C. Mueller, "Shear Wave Anisotropy and Coal Bed Methane Predictability", *SEG Extended Abstracts, pp.* 484–487 (1995), and the field data example therein).

A further point is made by Winterstein and Meadows, who note that Alford rotation requires that the two mismatched traces be identical (within limits established by noise), and that vertically variable anisotropy direction destroys this symmetry, in the VSP context. However, in the reflection context (with true vertical propagation), the mismatched traces are identical (except for noise) because of the Reciprocity Theorem (regarding interchange of source and receiver position), with or without vertical variation of anisotropy direction. This has been generally observed in practice, even though such work uses stacked traces, rather than true vertical traces.

Returning to the method of the present invention, like Winterstein and Meadows, the principal directions of asimuthal anisotropy are assumed to be piecewise constant with depth on a coarse-layer basis. There is no such restriction on the magnitude of the anisotropy, defined (See Thomsen, L., "Reflection Seismology over Azimuthally Anisotropic Media", *Geoph.*, 53, (3), pp. 304–313, 1988) as:

$$\gamma(z) = \frac{V_\parallel^2 - V_\perp^2}{2 V_\parallel^2} = \frac{V_\parallel - V_\perp}{V_\perp} \quad (5)$$

which may vary smoothly or rapidly, or on $V_\parallel(z)$ itself. Here, $V_\parallel$ is the velocity of the vertically travelling shear mode polarized parallel to the "fast" principal direction (i.e., to the imputed fractures), and $V_\perp$ is the velocity of the vertically travelling shear mode polarized perpendicular to the "fast" principal direction. It should be understood that if γ is large (>10%), and the elastic symmetry elements of the rock do not include a horizontal symmetry plane, then the application of the following argument is approximate, rather than exact.

Following earlier work, a stacked trace is regarded as an accurate surrogate for a normal incidence trace, although the conditions under which this is valid are not well understood. The following modelling results are for true vertical propagation in a medium with vertically variable HTI (Horizontal Transverse Isotropy) symmetry.

The solution is to strip the influence of the anisotropy in the upper layer from the reflected shear wave data. We will find that treating the more general model, with different fracture orientations in the overburden and cbs, is no more difficult than the simpler model discussed just above.

Reflection Layer-Stripping of Multi-component Data

The basic goal of layer-stripping is to transform the reflection traces, as recorded, into a new set of traces which correspond to a purely isotropic layer above the CBS. That is, the anisotropic effects o are to be stripped from the data.

In the context of the seismic signature/parameter Ra, the basic objective is to remove the influence of the overburden and obtain the parameter $R_a$ (i.e., equation 4), which characterizes the anisotropy inside the CBS. It should be understood that the reflection layer-stripping process of the invention may be used in other contexts and should not to be considered as being limited to the evaluation of $R_a$. It has broad application to many sedimentary contexts, not just in terms of a CBS model; coal beds magnify the effect of the overburden anisotropy, as described above. In one sense it is an improvement over (i.e., to the reflection context) the so-called "polarization layer-stripping" technique that was suggested by Winterstein and Meadows as a way to unravel depth-variant fracture orientation in zero-offset VSP's. Given the belief that vertical variation of the principal directions of anisotropy is common, it follows that the present technique will be useful in exploring for fractured sweet spots (e.g., coal bed methane and tight gas).

This is done on a coarse-layer basis (i.e., it is assumed, following Winterstein and Meadows), that the anisotropy direction (although not necessarily its magnitude) is piecewise constant within coarse layers. The plausibility of this assumption is generally related to the ultimate cause of the anisotropy, which lies with the regional stress field. The success of the process described below is a confirmation of its validity in practice. Like Winterstein and Meadows the same criteria is used to determine the tops and bottoms of these coarse layers, which must be thick enough for significant time lag (between the two shear modes) to develop. In practice, this has not proved to be a difficult problem, although interpretive judgement is required, as previously suggested by Winterstein and Meadows.

Figure 11:
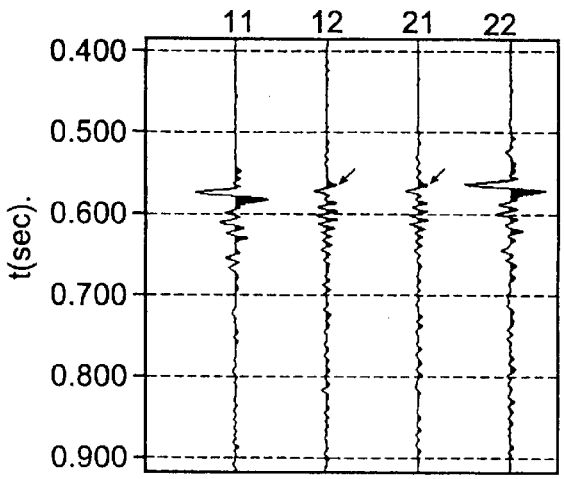
FIGS. 11 and 12 show the results of the rotation of the original data of FIG. 10 by 20° and by 30°, respectively, with respect to the initial coordinate system.
Figure 12:
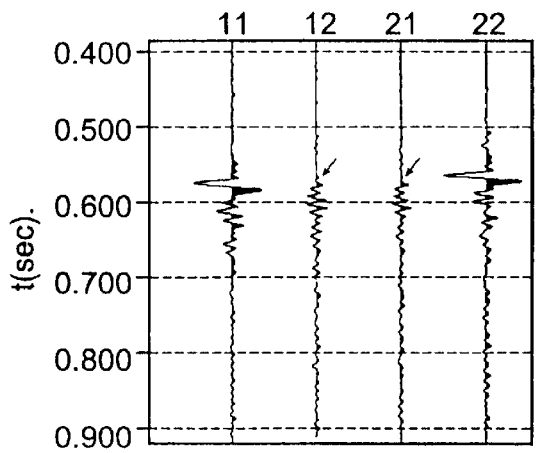

The first step is to find the principal directions of anisotropy in the overburden by performing MS/MR rotation of the data set in FIG. 10. Normally, rotation of four-component field data is carried out at every 10° or 15°, in order to select the angle that minimizes the energy on the mis-matched trace. FIGS. 11 and 12 show the results of the rotation of the original data by 20° and 30°, respectively, with respect to the initial coordinate system. The mismatched component of the reflection from the top-most coal bed (i.e., the first and most prominent arrival) almost disappears for a rotation angle of 30° (FIG. 12). The 20° rotation (FIG. 11) is clearly inadequate. Therefore, the 30° rotation has transformed the data into the principal axes of the overburden, thereby determining the orientation of anisotropy in the overburden (of course, the initial acquisition could have been at any angle). It should be recalled that the fast direction of the coals was oriented North and South and the fast direction of the overburden was N30E.

The mis-matched component of the first arrival does not disappear completely in FIG. 12 due to the influence of the reflection from the bottom of the first coal bed and weak coupling effects between the fast and slow modes at the top of the CBS. However, the principle directions of the anisotropy in the overburden are easy to determine on the rotated data, following this procedure. The difference in the arrival times between the (slow) 11 and (fast) 22 traces in FIG. 12 provides the time delay (10 msec) between the fast and slow reflection modes in the overburden. This difference is hard to see with the naked eye, but is easy to determine via cross-correlation.

The presence of reverberations/signal within the CBS time window on the mis-matched trace of FIG. 12 is an anisotropic effect due to the difference in fracture orientation in both the CBS and the overburden. To determine this, the influence of the anisotropy in the overburden on the data in FIG. 12 has to be eliminated.

Figure 13:
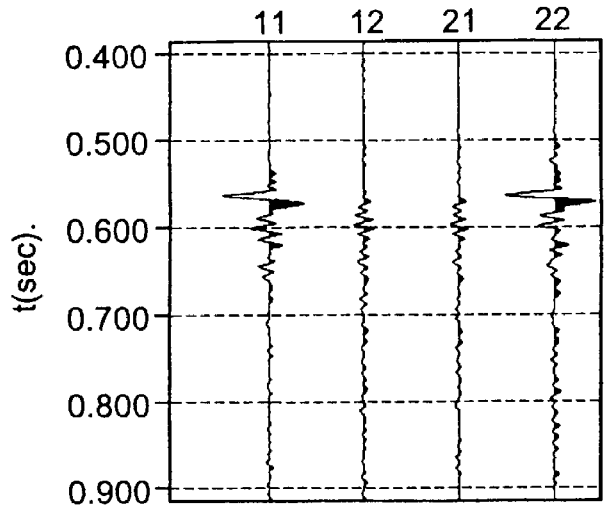
FIG. 13 depicts the data of FIG. 12 after compensation for the overburden.

The objective of the layer-stripping process is to transform the reflection traces obtained in the principal axes of anisotropy of the overburden (FIG. 12) into a different set of traces which would correspond to a purely isotropic layer above the CBS. Thus, with the bottom limit of the uppermost coarse layer (of uniform anisotropy direction, but arbitrary anisotropy and impedance variation) established, the next step is to time-align the slow-mode 11 trace and fast-mode 22 reflections from the bottom reflection (i.e., the top of the CBS) by moving the slow-mode 11 trace up by 10 msec. However, the mis-matched traces 12 and 21 are moved up by only half that amount (5 msec), since each of these has traveled one-way (e.g., down) only as a slow mode, the other way as a fast mode. The fast-mode trace 22 is not shifted at all; the resulting traces are shown in FIG. 13. This procedure eliminates the time delays caused by the anisotropy in the overburden. The differences in attenuation and geometrical spreading between the two shear modes in the overburden are assumed to be negligibly small. This assumption has been justified by in-field applications of the layer-stripping algorithm (a detailed discussion of one example is provided later).

Those skilled in the art will appreciate that the special treatment given to the mis-matched traces is just one step that distinguishes the present reflection layer-stripping process from the VSP layer-stripping process of Winterstein and Meadows (See Winterstein, D. F. and M. A. Meadows, "Shear-Wave Polarizations and Subsurface Stress Directions at Lost Hills Field", Geophysics, 56, pp. 1331–1348, 1991; and U.S. Pat. Nos. 5,060,203 and 5,060,204). Identical (i.e., where only the slow-source 11 and 12 traces are time-shifted by the same one-way time delay) treatment of the three delayed traces by the process of Winterstein and Meadows would not give correct results.

After applying the corrections, the next step is performed. In particular, the data set of FIG. 13 is processed as if it had been acquired over a purely isotropic overburden. By tensor-rotating the traces in FIG. 13 (by −30 degrees in this case), the principal axes of anisotropy in the coal (See FIG. 14) are found. The absence of energy on the mis-matched component verifies that the layer-stripping procedure has been carried out correctly. Zero amplitudes on the mis-matched trade also tell us that the coupling between the two shear modes during reflection/transmission at the top of the CBS is very weak.

Figure 14:
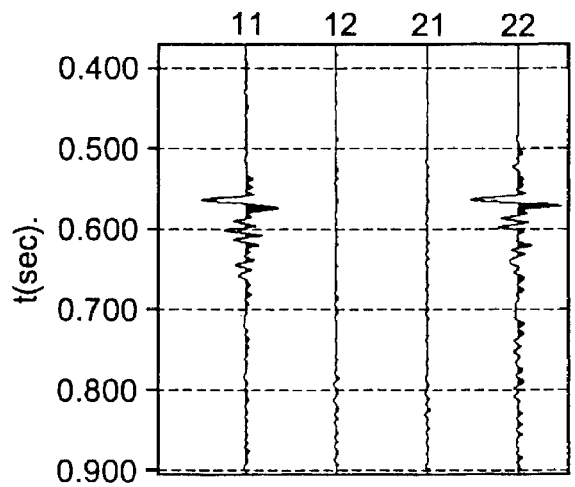
FIG. 14 shows the result of rotating the trace of FIG. 13 to find the principal axes of anisotropy in the coal.

The traces in FIG. 14 correspond to the same coordinate system as the original data in FIG. 10; the difference between the two plots is entirely due to the layer-stripping which made the traces more easily interpretable in terms of the coalbed anisotropy. Of course, aside from this pedagogic point, there is nothing special about the orientation of FIG. 10; in particular, the present procedure does not require prior knowledge about anisotropy, bed geometry, etc.

Figure 15:
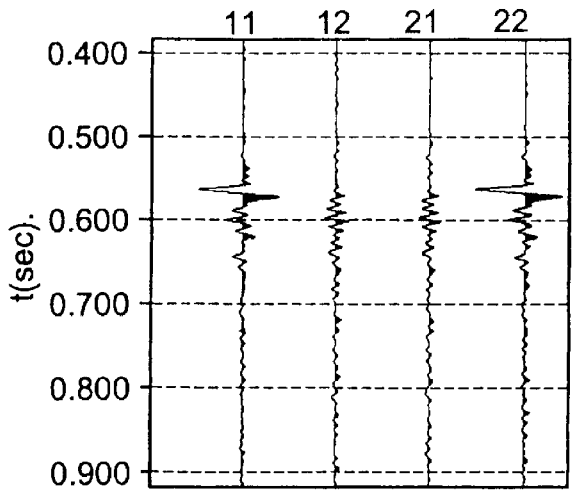
FIG. 15 shows the result of performing a canonical rotation by 45° to the data of FIG. 14 to obtain the parameter $R_a$.

Finally, a canonical rotation by 45 degrees (FIG. 15) can be performed to obtain the parameter $R_a$, the global measure of CBS anisotropy. It is interesting to compare FIG. 15 with FIG. 4, which shows the same acquisition for the same model, but with isotropic overburden. The plots (and the value of $R_a$) are practically identical, which provides further evidence for the robustness of this layer-stripping procedure.

It should be emphasized that the polarization layer-stripping process of the present invention can be repeated as many times as necessary, if the medium at hand contains several layers with different fracture orientations. However, multiple application of layer-stripping might lead to accumulation of errors with depth, so the process should be applied with discrimination.

Detailed Example

The above-described shear wave method for fracture detection in coals has been field-tested in the Sydney Basins of New South Wales. Conventional multi-source/multi-receiver (MS/MR) acquisition techniques were used; however, the processing and anisotropic evaluation was designed to accommodate the special situations created by the thin bed, multi-layer coalbed sequences.

In the Sydney Basin acreage of interest, the top coal (the Bulli seam) occurs at depths ranging from 400 to 900 m (see FIG. 2 for a representation of a typical coal sequence). The near surface consists of Triassic age Hawkesbury sandstone (i.e., outcrops of this unit form the spectacular beach cliffs at Sydney). The surface conditions are rolling pasture and bush country with varying soil thicknesses. Since the target is relatively shallow and the CBS fracture swarms are potentially quite small (i.e., on the order of 100's of meters or less), the acquisition was designed to minimize the depth-point spacing. The survey was chosen to be large enough to detect the occasional sweet spot, despite potentially variable data quality.

The recording equipment comprised two Geosource DSS-10 24 channel systems, 3-component geophones and 2 Hertz model M-13 horizontal vibrators. The recording electronics were Pelton Model 5 Advance I with ground-force phase and ground-force control. The vibrators generated 50,000 lbs force, with the ground-force signal in phase with the reference signal. The recording capacity (i.e., 48 channels) available, divided between the 3-component geophones, meant that there would only be 16 channels/modes for each deployment. The acquisition plan was designed therefore to take advantage of the relative mobility of the vibrators, as compared with the geophones. That is, vibration points were occupied multiple times for each geophone deployment. The planned sweep was 8 to 80 Hz with a 16 second length, recorded into 20 second records. Cross-correlation was performed by a local vendor. Shear-mode (i.e., in-line/cross-line) separation and record assembly was conventional and the data were prepped via a ufh script (i.e., the multi-component data was prepped while still "multiplexed in the in-line, cross-line recording traces). Later, PROMAX was used for these tasks.

Due to the limited array (i.e., receiver and source) deployment, surface waves dominated the raw field common-shot gathers. It was possible to see the different surface modes excited by the in-line vs. cross-line source motion, recorded into the in-line, cross-line and vertical geophones. For example, the compressional first breaks were easily recognized on the in-line source-to-vertical receiver records, while the various shear and surface modes are often co-incident, and would ring throughout a record, obscuring all reflections. The velocities of the various waves were:

| | |
|---|---|
| Direct compressional | 4000 m/sec; |
| Direct shear | 1900 m/sec; |
| Surface modes | 750 m/sec to 1500 m/sec; |
| Target shear stacking velocity | 2000 m/sec; |
| Target interval Vs | 1000 m/sec; |
| Target interval Vp | 2500 m/sec |
| Overburden interval Vs | 2100 m/sec; |
| Overburden interval Vp | 3600 m/sec. |

One possibly confusing aspect of multi-component processing is the mode separation and organization. Each field record corresponds to a particular source mode, in-line or cross-line. Traces in each multi-component record will be multiplexed: in-line, cross-line and vertical. Once properly separated, the data can be assembled into 3-, 4-, 6- or 9-component plots. This recording resulted in a 6-component data set (i.e., cross-line vibrator and in-line vibrator with in-line receiver, cross-line receiver and vertical receiver). The four horizontal components are required for the analysis previously described. Processing of these components is simplified once they are separated, since all components are run through the same flow.

Processing requires refraction statics (i.e., calculated from the cross-line/cross-line component), and then, usually, a simple processing where any scaling or noise reduction techniques must preserve relative amplitudes (among the different components). This implies that if, for example, AGC is desired, the scalars must be calculated once and stored for identical application to all components. This calculation process can be rendered "multi-component" by stacking the scalar files derived from each individual component. Similarly, noise reduction techniques should not involve untrackable scaling procedures. Moveout velocity calculation should be performed once, then applied identically to all four components. The calculation is typically done on the cross-line/cross-line component, though any component with the best (pre-rotation) reflector strength can be used. Often, pre-rotation shear wave data quality does not lend itself to semblance-based velocity analysis. In this case, constant velocity stacks are very useful.

Evaluation of anisotropy can be done both pre-stack or post-stack. However, the use of pre-stack rotation is usually discouraged, since the rotation algorithms available are designed for normal-incidence ray paths. Typically first-pass anisotropic analysis is performed with brute stacks. The four separate stacks can be considered as a 2 by 2 matrix. The rotation analysis is greatly simplified by keeping the records in this matrix format, with a separate matrix being produced for each rotation. First-pass rotations are typically done at 0°, 15°, 30°, 45°, 60°, 75° and 90° (those skilled in the art will appreciate that 90° rotation merely switches the main and off diagonal components, i.e., a matrix transpose operation). A C-shell script that accomplishes this task of multiple rotations and appropriate display is provided in Appendix B. Once rotation has been applied, the in-line and cross-line nomenclature is inappropriate. Component designation in terms of particle motion with respect to compass directions is necessary. Once a series of rotations is obtained, it is easy to observe the optimal rotation by studying the reflector strength on the off-diagonal components. Where the off-diagonal component reflector strength is minimized, the best rotation is achieved (i.e., FIG. 16B). Repeating the procedure, with smaller angular differences, in a range around this first-pass "best" angle may be warranted. Appendix C is a mathematical description of layer stripping for four component (4C) surface reflected and VSP shear wave data.

The presence of coherent energy on the off-diagonal sections indicates azimuthal anisotropy. By rotating, such that this energy is minimized, the misalignment between the survey (line) azimuth and the principal axes of the overburden is corrected. This conclusion follows, since no coherent energy remains on the off-diagonal sections at any time within the overburden time-window.

Taking the optimally-rotated matrix and performing a 45° rotation, in accordance with the present invention, after compensation for overburden anisotropy, reveals coherent energy on the off-diagonal sections in the CBS time window. This indicates and measures patches of anisotropy below the overburden, in the CBS. These patches are interpreted (See T. A. Chaimov, G. J. Beaudoin, W. W. Haggard, and M. C. Mueller, "Shear Wave Anisotand and Coal Bed Methane Predictability", SEG Extended Abstracts, pp. 315–388 1995) as indicating sweetspots of high fracture intensity, with an implication of high fracture permeability, oriented along the fast direction of anisotropy in the CBS. Since no significant coherent energy was seen here (See FIG. 16C), it can be concluded, in accordance with the present invention, that there is little or no CBS azimuthal anisotropy, hence little or no CBS fracturing at this site. This experimental conclusion was confirmed by:

* Core-plug analysis (absence of fractures in the cores), and
* VSP analysis (i.e., employing downhole rotations of the 4-component VSP dataset).

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, while the invention has been described in the context of coal beds, its teachings may be extended to other carbonaceous sequences such as antrium and devonian shales. Moreover, in the event that the overburden is essentially azimuthally isotropic, layer stripping need not be performed. Similarly, the layer stripping method of the invention is not restricted to carbonaceous sequences; it is applicable to a broad range of sub-surface geometries with a vertical variation of anisotropy. Finally, it should be understood that if the subsurface is in fact characterized by piece-wise constant anisotropy direction, then within each successive coarse layer, the data matrix is symmetric in either the VSP context Or the reflection context. The various layers may then be successfully stripped of their anisotropy following the procedure outlined above, or that of Winterstein and Meadows, depending on the experimental configuration. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

Appendix A

Anisotropy and Cleats

Cleats in coal beds are most commonly tensile fractures (i.e., the displacement is normal to the cleating plane, rather than en the plane, as with shear fractures). There are most commonly two cleat sets, both vertical (or bed-normal, if the coal beds dip), and mutually orthogonal. This orthogonality is not accidental, but is a consequence of the orthogonality of the stress tensor. It is a natural manifestation, on a macroscopic scale, of a basic law of physics.

In particular, the cleats are oriented by the regional horizontal stress field. If, as some have suggested, they were caused by volumetric contraction of the coals (during the coalification process) in a vertical stress field, then they would have polygonal orientations, as with mud cracks or columnar jointing in basalts. Such volumetric contraction undoubtedly takes place, but the cleats are oriented by the horizontal stress field, and this orientation is stable, over horizontal distances-which are large compared to a seismic Fresnel zone.

The two orthogonal crack sets are commonly not equivalent. One set (the face cleats) is longer; the other (the butt cleats) commonly terminates against the first. Hydraulic conductance obviously depends upon both the length and the width of the cleat, while seismic anisotropy depends (see discussion that follows and that leads to equation 5a) only on the length of the cleat. Therefore, it is reasonable to approximate the seismic anisotropy in terms of a single set of cracks (i.e., the face cleats).

The crack-induced anisotropy for a single set of circular cracks, most commonly discussed in the literature, is given by Hudson (See Hudson, J. A., "Overall Properties of a Cracked Solid", *Math Proc. Camb. Phil. Soc.*, 88, p. 371, 1980.). Thomsen (See Thomsen, L., "Elastic Anisotropy due to Aligned Cracks in Porous Rock", *Eur. Assoc. Expl. Geoph. Convention Abstrs.*, 53, pp. 244–245, 1991; *Geoph. Prospctg.*, 1995.) showed that, if the cracks are imbedded in a porous rock (as opposed to a solid), then that porosity contributes to the anisotropy, even though (by definition) there is no preferred orientation to it. This happens because of fluid pressure equalization, at seismic frequencies, between the fluid in the cracks and the pores. This generalization was confirmed experimentally by Rathore et al. (See Rathore, J. S., Fjaer, E., Holt, R. M., Renlie, L., "P- and S-wave Anisotropy of a Synthetic Sandstone with Controlled Crack Geometry", *Geoph. Prospctng.*, 43 pp. 711–1995).

In coals, the permeability of the coal matrix is so low that this effect may be ignored. Hence, the equations reduce to those of Hudson (see Hudson, J. A., "Overall Properties of a Cracked Solid", *Math Proc. Camb. Phil. Soc.*, 88, p. 371, 1980). Following the notation of Thomsen (See Thomsen, L., "Weak Elastic Anisotropy", *Geoph.*, 51, (10), pp. 1954–1966, 1986), they are:

$$V_p(\theta) = V_p(90°) [1 + \delta \cos^2\theta \sin^2\theta + \epsilon \cos^4\theta] \quad (1a)$$

$$V_s^\perp(\theta) = V_s(90°) [1 + \sigma \cos^2\theta \sin^2\theta] \quad (1b)$$

$$V_s^\parallel(\theta) = V_s(90°) [1 + \gamma \cos^2\theta] \quad (1c)$$

Here, $V_p(90°)$ and $V_s(90°)$ are the P and S velocities for rays traveling along the symmetry direction (i.e., since the cracks are vertical, for horizontal rays that are 90° from the vertical); and $\theta$ is the ray incidence-angle, measured from the vertical in the plane which is normal to the cracks. The anisotropy parameters are given in terms of elastic moduli by Thomsen and in terms of crack density (cf. Thomsen, L., "Elastic Anisotropy due to Aligned Cracks in Porous Rock", *Eur. Assoc. Expl. Geoph. Convention Abstrs.*, 53, pp. 244–245, 1991; *Geoph. Prospctg.*, 43, pp. 805–829, 1995). by:

$$\epsilon = 0 \quad (2a)$$

$$\delta = -\frac{16}{3} \left( \frac{1-2\nu}{2-\nu} \right) \eta \quad (2b)$$

$$\gamma = \frac{8}{3} \left( \frac{1-\nu}{2-\nu} \right) \eta \quad (2c)$$

$$\sigma = \left[ \frac{V_p(90°)}{V_s(90°)} \right]^2 (\epsilon - \delta) \quad (2d)$$

where $\nu$ is the Poisson's ratio of the coal matrix, and the (non-dimensional) crack density is:

$$\eta = N_V < \frac{d^3}{8} > \quad (3a)$$

where $N_V$ is the number of cracks per unit volume, and d is the crack diameter. The braces indicate a volumetric average.

For vertically incident velocities:

$$V_p(0°) = V_p(90°) \quad (4a)$$

$$V_s^\perp(0°) = V_s(90°) \quad (4b)$$

$$V_s^\parallel(0°) = V_s(90°)(1+\gamma) \quad (4c)$$

Equations (4b) and (4c) are clearly consistent with equation (3).

Further progress can be made in this special case (i.e., vertical propagation, no porosity) toward a theory which is more satisfactory for the coalbed context. Consider that these cracks are aligned in the 1-direction (i.e., x-direction), and denote the associated (face) crack density as $\eta_1$. Next, consider instead a single set of (butt) racks aligned along the 2-direction, with crack density $\eta 2$. Finally, consider the combination of these two cracks sets; in the linear limit of low crack densities, it is clear that the crack effects superpose linearly, so that the shear anisotropy is:

$$\gamma_{12} = \frac{V_{s1}(0°) - V_{s2}(0°)}{V_{s1}(90°)} = \frac{8}{3} \left( \frac{1-\nu}{2-\nu} \right) (\eta_1 - \eta_2) \quad (5a)$$

For coal, a Poisson's ratio $\nu = 0.33$ is plausible (See Greenhalgh, S. A. and D. W. Emerson, "Elastic Properties of Coal Measure Rocks from the Sydney Basin, New South Wales", *Exploration Geophysics*, 17, pp. 157–163, 1986) so that the coefficient in equation (5a) is 16/3.

From equation (5a) it is clear that the size of the cracks strongly affects the anisotropy. If the butt cleats are half as long as the face cleats, and equally numerous, butt crack density $\eta_2$ is one-eighth the magnitude of face cleat density $\eta_1$. The two orthogonal crack sets are commonly not equivalent. One set (the face cleats) is longer; the other (the butt cleats) commonly terminates against the first. Hydraulic conductance obviously depends upon both the length and the width of the cleat, while seismic anisotropy depends only on the length of the cleat. Therefore, it is reasonable to approximate the seismic anisotropy in terms of a single set of cracks (i.e., the face cleats). Therefore, neglecting butt cleats in equation (5a), and in the rest of the discussion, at least for the present, is believed to be appropriate.

Appendix B

Rotation Script

Figure 16A:
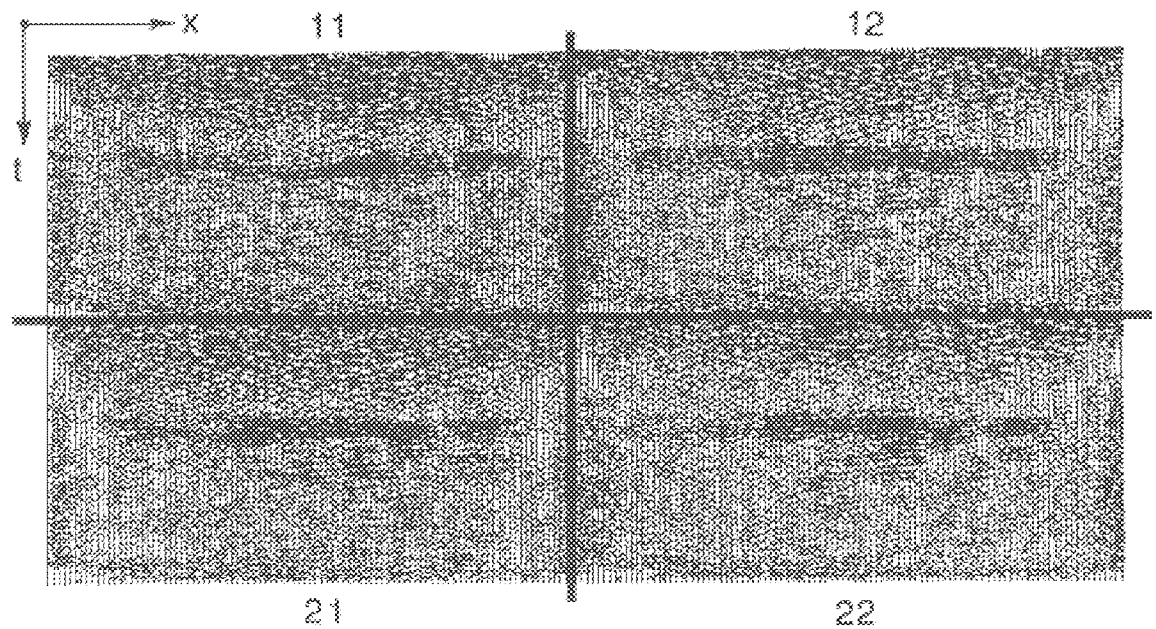
FIGS. 16A, 16B and 16C depict the original data, the optimally rotated data and the stripped data rotated by 45°.
Figure 16B:
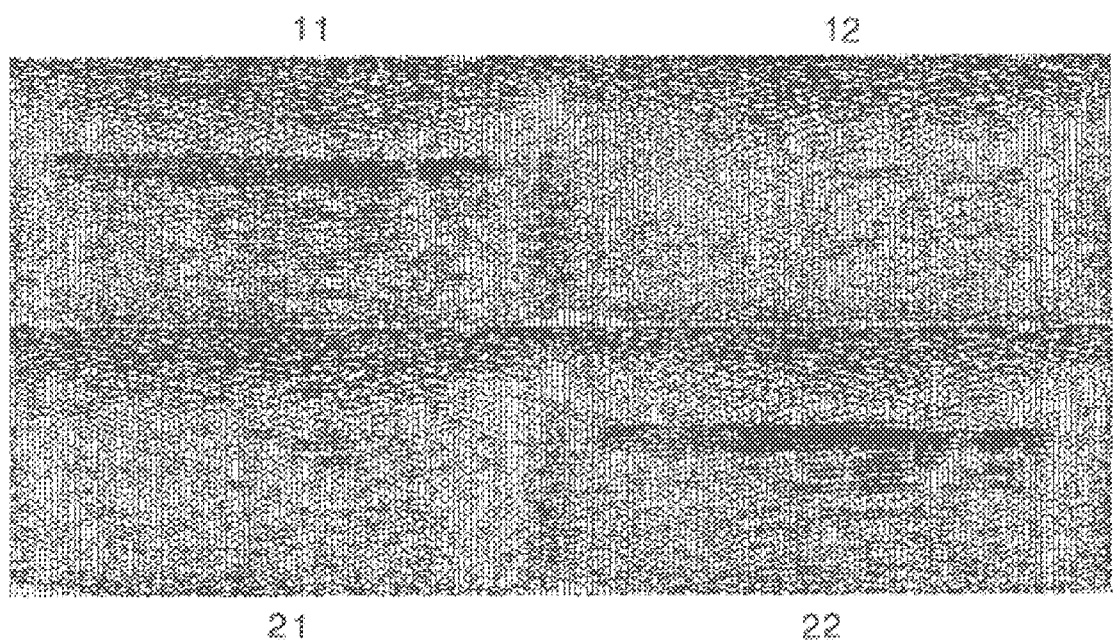

The following is a C-shell script that will allow the user to take the four data matrix files (named with a "root name" followed by extensions of 0.11, 0.12, 0.21, 0.22) and have them rotated by the requested "start angle", "end angle," and "angle increment." The script then arranges the four input files into a single record in one output file, as seen in FIG. 16*a*, where each rotation performed is appended onto the output file as a separate record containing the 4-component data matrix.

```
#! /bin/csh
# this is a C-shell script for ITERATIVE CONSTANT ANGLE
# INCREMENT RCTATIONS
```

-continued

```
# data set name' (root)     NM
# start angle,              sa
# end angle,                ea
# angle increment,          da

# the "@" sign assigns a numeric value to the name
# immediately following it and the number in "[ ]" denotes
# the position of the nth argument on the# command line
unset noclobber filec
if ( $#argv < 3 ) then
    echo " "
    echo " "
    echo " "
    echo "rotzs2.x: Iterative constant angle rotations"
    echo " "
    echo " "
    echo "Input:"
    echo " "
    echo "   File Name (root)    -N[NM]"
    echo "   Start angle         -sa[sa]"
    echo "   End angle           -ea[ea]"
    echo "   Angle Increment     -da[da]"
    echo " "
    echo "Usage:"
    echo " "
    echo "rotzs2.x -N[ ] -sa [ ] -ea[ ] -da[ ]"
    exit
endif
set NM = 'usparg -N " "$*'
@ sa = 'usparg -sa "0" $*'
@ ea = 'usparg -ea "0" $*'
@ da = 'usparg -da "0" $*'
@ nsamp = 'getval -N$NM.11 -LNumSmp'
@ nsi = 'getval -N$NM.11 -LsmpInt'
@ nrecs = 'getval -N$NM.11 -LNumRec'
@ tnrecs = 2 * $nrecs
@ te = $nsamp * $nsi
@ *dte = 2 * $te
@ mte = -1 * $te
if ( $sa == $ea ) then
    echo "You must provide reasonable rotation parameters
(-sa[ ], -ea[ ], -da[ ])"
    exit 1
endif
echo "Data Set Name (root) =   "$NM
echo "Start Angle =            "$sa
echo "End Angle =              "$ea
echo "Angle Increment =        "$da
# initialize the internal parameter vv to start at sa
@ vv = $sa
# initialize a iteration counter
@ numiter = 1
# initialize a temp parm
@ temp = -1
@ vw = 0
# loop for as long as vv is less than or equal to ea
##################### start while   loop
###########################
while ( $vv <= $ea
# print to stdout then current value of vv
    echo "starting on angle = "$vv
    echo "at " 'date'
    echo "  this is iteration number= "$numiter
# for the angle vv do const.angle rotations (on cdp stacked
# data)
    rotzs2 -N$NM -R$vv
    # each const. angle rotation is a record appended to the
    # final output file for each component 11, 12, 21, 22
    # Assemble a rotation matrix for each angle output from
    # rotzs2.
    #                       11,12
    #                       21,22
# give each component twice the input samples (time) for
# vertical stacking
if ( $vv > -1 && $vv < 10 ) then
    wind -e$dte -N$NM.R"+"0$vv.11 -O$NM.11.wind
    wind -e$dte -N$NM.R"+"0$vv.12 -O$NM.12.wind
    wind -s$mte -N$NM.R"+"0$vv.21 -O$NM.21.wind
    wind -s$mte -N$NM.R"+"0$vv.22 -O$NM.22.wind
    /usr/bin/rm $NM.R"+"0$vv.11
    /usr/bin/rm $NM.R"+"0$vv.12
    /usr/bin/rm $NM.R"+"0$vv.21
    /usr/bin/rm $NM.R"+"0$vv.22
endif
if ( $vv > --10 && $vv < -1 ) then
    @ vw = $VV * $temp
    wind -e$dte -N$NM.R"-"0$vw.11 -O$NM.11.wind
    wind -e$dte -N$NM.R"-"0$vw.12 -O$NM.12.wind
    wind -s$mte -N$NM.R"-"0$vw.21 -O$NM.21.wind
    wind -s$mte -N$NM.R"-"0$vw.22 -O$NM.22.wind
    /usr/bin/rm $NM.R"-"0$vw.11
    /usr/bin/rm $NM.R"-"0$vw.12
    /usr/bin/rm $NM.R"-"0$vw.21
    /usr/bin/rm $NM.R"-"0$vw.22
endif
if ( $vv < -9 ) then
    wind -e$dte -N$NM.R$vv.11 -O$NM.11.wind
    wind -e$dte -N$NM.R$vv.12 -O$NM.12.wind
    wind -s$mte -N$NM.R$vv.21 -O$NM.21.wind
    wind -s$mte -N$NM.R$vv.22 -O$NM.22.wind
    /usr/bin/rm $NM.R$vv.11
    /usr/bin/rm $NM.R$vv.12
    /usr/bin/rm $NM.R$vv.21
    /usr/bin/rm $NM.R$vv.22
endif
if ( $vv >9 ) then
    wind -e$dte -N$NM.R"+"0$vv.11 -O$NM.11.wind
    wind -e$dte -N$NM.R"+"0$vv.12 -O$NM.12.wind
    wind -s$mte -N$NM.R"+"0$vv.21 -O$NM.21.wind
    wind -s$mte -N$NM.R"+"0$vv.22 -O$NM.22.wind
    /usr/bin/rm $NM.R"+"$vv.11
    /usr/bin/rm $NM.R"+"$vv.12
    /usr/bin/rm $NM.R"+"$vv.21
    /usr/bin/rm $NM.R"+"$vv.22
endif
# vertically stack the 11 on top of the 21 and the 12 on top
# of the 22
    vstak -N1$NM.11.wind -N2$NM.21.wind -O$NM.col1
    vstak -N1$NM.12.wind -N2$NM.22.wind -O$NM.col2
    /usr/bin/rm $NM.11.wind
    /usr/bin/rm $NM.12.wind
    /usr/bin/rm $NM.21.wind
    /usr/bin/rm $NM.22.wind
# append col2 next to (after) col1
    append -N$NM.col2 -O$NM.col1
    # get record numbering and traces cleaned up before assembly
    # in output file
    # note that when modifying trace headers you must use a
    # different -O from -N
    utop -R1 -L$tnrecs -k0RecNum=$numiter -N$NM.col1
-O$NM. temp
if ( $numiter == 1 ) mv $NM.temp $NM.matrix
if ( $numiter > 1 ) append -N$NM.temp -O$NM.matrix
# now increase the current (numeric) value of vv by the
# value da
    @ vv = $VV + $da
# increase the iteration counter by 1
    @ numiter = $numiter + 1
    rmprint
end
##################### end   "while"   loop
###########################
# clean up your mess buster . . .
/usr/bin/rm $NM.col1
/usr/bin/rm $NM.col2
/usr/bin/rm $NM.temp
exit 0
```

APPENDIX C

Coarse-Layer Stripping of Shear-Wave Data for

Vertically Variable Azimuthal Anisotropy

The concept of the invention is shown in FIGS. A and B. FIG. A shows schematically two layers 10 and 20 of the earth, each populated with a single set of vertical, aligned cracks 12 and 14 (which render each layer azimuthally anisotropic), but with different azimuthal orientations for each layer. The arrows show the raypaths for a shear wave generated at the surface 18 with a fixed polarization. As the wave goes down, it splits into two waves 16a and 16b in the first layer 10, then into four in the second layer, and into six upon reflection back through the first layer, etc. The recorded signal (containing all of these arrivals) is very complex, and not interpretable without processing.

FIG. B shows schematically how the invention processes the data from FIG. A so that it appears to come from the simpler configuration in FIG. B. The invention "strips" the anisotropy out of the upper layer 10, so that it is effectively isotropic, and there is no splitting of the wave 16, either downgoing or upcoming in that layer. This reduces the problem to the analysis of wave-splitting in a single layer.

Reflection Layer-Stripping (4C)

The received signal from a 4-component (4C) reflection seismology set-up or experiment (i.e., two transverse source orientations, two transverse receiver orientations) may be written as:

$$S_0(2t_1+2t_2)=2R(-\theta_1)P_1 \otimes T^{21}R(\theta_1-\theta_2)P_2 \otimes RP_2 \otimes R(\theta_2-\theta_1)T^{12}P_1 \otimes R(\theta_1)s_0 w(t)S_0 \quad \text{(EQ 1)}$$

Here, unless otherwise noted, the terms printed in bold type face are matrices.

$S_0(2t_1+2t_2)$ is a 2 by 2 matrix of seismic data traces, each column representing the two receiver components of data excited by the corresponding source component. Each of these traces is composed of a surrogate normal-incidence trace, formed by stacking together several oblique-incidence traces, with correction for "normal moveout", following conventional practice. The subscript "0" indicates that these vectors refer to the survey coordinate system. The argument $(2t_1+2t_2)$ indicates that this refers to arrivals which have travelled two ways (i.e., down and back up) through both layer-1 and layer-2 of a coarse-layer sequence, as in FIGS. A and B.

The objective is to solve EQ. (1) for the "principal time series" (i.e., for the arrivals corresponding to pure modes, fast or slow, through the sequence of layers). From these, one can deduce the orientation and the magnitude of the anisotropy in each layer. The notation is: starting from the right:

$S_0$ without arguments is the matrix of source orientations. Assuming an inline source, and a crossline source of equal strength, this may be written as $$S_0 = \begin{bmatrix} 1 & 0 \\ 0 & 1 \end{bmatrix} = \mathbf{I};$$

w(t) is the seismic wavelet;

$s_0$ is its initial amplitude;

$R(\theta_1)$ is the rotation matrix for expressing this matrix in the principal coordinate system of the downgoing ray, aligned with the preferred directions in layer-1 (in the example of FIGS. A and B, the strike of the cracks in layer-1) and $$\mathbf{R}(\theta_1) = \begin{bmatrix} \cos\theta_1 & \sin\theta_1 \\ -\sin\theta_1 & \cos\theta_1 \end{bmatrix}; \quad \text{(EQ 2)}$$

$P_1$ is the propagator matrix for the top layer, and $$P_1 = \begin{bmatrix} A_1^f \, \delta(t-t_1^f) & 0 \\ 0 & A_1^s \, \delta(t-t_1^s) \end{bmatrix}; \quad \text{(EQ 3)}$$

"$\otimes$" indicates convolution;

$A_1^f$ is a propagation "filter" accounting for geometric spreading, attenuation, dispersion, etc., for the fast component;

$t_1^f = Z_1/V_1^f$ is its one-way travel-time;

$A_1^s$ and $t_1^s$ are the corresponding quantities for the slow component;

$T^2$ is the scalar transmission coefficient between layer-1 and layer-2;

$R(\theta_2-\theta_1)$ further rotates to the angle of layer-2;

$P_2$ is the propagator operator for layer-2, and $$P_2 = \begin{bmatrix} A_2^f \otimes \delta(t-t_2^f) & 0 \\ 0 & A_2^s \otimes \delta(t-t_2^s) \end{bmatrix}; \text{ and} \quad \text{(EQ 4)}$$

R is the reflection coefficient matrix (assumed diagonal) at the bottom of layer-2, $$\mathbf{R} = \begin{bmatrix} R_{11} & 0 \\ 0 & R_{22} \end{bmatrix}. \quad \text{(EQ 5)}$$

Note that the subsequent rotation matrices (e.g., R ($\theta_2-\theta_1$), R($-\theta_1$), etc.) have arguments which are the negatives of the previous rotation arguments, indicating the opposite sense of rotation. The factor "2" accounts for the interaction with the free surface.

By operating on $S_0(2t_1+2t_2)$ from the left with $R(\theta_1)$ and from the right with $R(-\theta_1)$, the data can be rotated to a system of coordinates aligned with the principal directions of anisotropy of layer-1. The left-hand side of EQ. (1) then becomes the 4C data as expressed in the coordinates of layer-1:

$$S_1(2t_1+2t_2) = \mathbf{R}(\theta_1)S_0(2t_1+2t_2)\mathbf{R}(-\theta_1) \quad \text{(EQ 6)}$$

$$= \mathbf{P}_1\mathbf{R}(\theta_1-\theta_2)\mathbf{P}_2 \otimes 2T^{21}\mathbf{R}s_0 w(t)T^{12} \otimes \mathbf{P}_2 \otimes \mathbf{R}(\theta_2-\theta_1)\mathbf{P}_1 \quad \text{(EQ 7)}$$

In the special case where the two angles are equal, this expression reduces to the case of uniform orientation of anisotropy, (i.e., to the case considered by Alford (See Alford, R. M., "Shear data in the presence of azimuthal anisotropy", $56^{th}$ Ann. Internat. Mtg. Soc. Explor. Geophys., Expd. Absts., 476–479 (1986)) and Thomsen (See Thomsen, L., "Reflection seismology over azimuthally anisotropic media," Geophysics, 53(3), 304–313 (1988)), and EQ. (7) reduces to their solution. The initially unknown angle $\theta_1$ is chosen so as to minimize the off-diagonal components of the rotated data, EQ. (2), for times less than $t_1^f$. The significant energy on the off-diagonal components at times greater than $t_1^f$ can be used to identify $t_1^f$.

Defining the time delay, between the modes, at the bottom of layer-1 as:

$$\Delta t_1 = t_1^s - t_1^f,$$

the anisotropy of layer-1 can be stripped-off by means of a mode-advance operator:

$$D_1 = \begin{bmatrix} \delta(t) & 0 \\ 0 & \delta(t - \Delta t_1) \end{bmatrix} \qquad (EQ\ 8)$$

Operating on EQ. (7) from the left and the right with $D_1$ and assuming that the propagation filters $A_1^f$ and $A_1^s$ are assumed to be equal, then:

$$P_1 \otimes D_1 = \begin{bmatrix} A_1^f & 0 \\ 0 & A_1^s \end{bmatrix} \otimes \delta(t - t_1^f) \approx A_1 \otimes \delta(t - t_1^f) = D_1 \otimes P_1 \qquad (EQ\ 9)$$

so that application of $D_1$ advances the slow mode (i.e., strips off the anisotropy of layer-1). The left side of layer-stripped EQ. (7) is:

$$S_1(2t_1 + 2t_2) \equiv D_1 \otimes S_1(2t_1 + 2t_2) \otimes D_1 \qquad (EQ\ 10)$$

or $$S_1(2t_1+2t_2)=A_1 \otimes \delta(t-t_1^f)R(\theta_1-\theta_2) \otimes P_2 \otimes 2T^{21}Rs_0w(t)T^{12} \otimes P_2 \\ \otimes R(\theta_2-\theta_1)\delta(t-t_1^f) \otimes A_1 \qquad (EQ\ 11)$$

$$= R(\theta_1-\theta_2)[A_1 \otimes \delta(t-t_1^f) \otimes P_2 \otimes 2T^{21}Rs_0w(t)T^{12} \otimes P_2 \otimes \delta(t-t_1^f) \\ \otimes A_1]R(\theta_2-\theta_1) \qquad (EQ\ 12)$$

The quantity in square brackets in EQ. (12) is the "layer-stripped principal time-series:"

$$s(t) = A_1 \otimes \delta(t - t_1^f) \otimes P_2 \otimes 2T^{21}Rs_0w(t)T^{12} \otimes P_2 \otimes \delta(t - t_1^f) \otimes A_1 \qquad (EQ\ 13)$$

$$= 2s_0 T^{21} T^{12} A_1 \otimes R \begin{bmatrix} A_2^f \otimes w(t - 2t_1^f - 2t_2^f) & 0 \\ 0 & A_2^s \otimes w(t - 2t_1^f - 2t_2^f - 2\Delta t_1) \end{bmatrix} \qquad (EQ\ 14)$$

Notice the greater delay of the 22 component.

The orientation and magnitude of the layer-2 anisotropy may be determined, following the previous procedures. Solving EQ. (14), $$s(t) = R(\theta_2 - \theta_1)S_1(2t_1 + 2t_2)R(\theta_1 - \theta_2) \qquad (EQ\ 15)$$

which is exactly analogous to EQ. (6). In words, the layer-stripped principal time-series is just the layer-stripped, re-rotated data.

The recipe for layer-stripping is given by (cf., EQ. (10)):

$$S_1(2t_1 + 2t_2) = \begin{bmatrix} \delta(t) & 0 \\ 0 & \delta(t - \Delta t_1) \end{bmatrix} \otimes \begin{bmatrix} S_{11}^1(t) & S_{12}^1(t) \\ S_{21}^1(t) & S_{22}^1(t) \end{bmatrix} \otimes \begin{bmatrix} \delta(t) & 0 \\ 0 & \delta(t - \Delta t_1) \end{bmatrix} \qquad (EQ\ 16)$$

$$= \begin{bmatrix} S_{11}^1(t) & S_{12}^1(t - \Delta t_1) \\ S_{12}^1(t - \Delta t_1) & S_{22}^1(t - 2\Delta t_1) \end{bmatrix} \qquad (EQ\ 17)$$

On these matrix elements, the superscript "1" indicates that this is data which has been rotated into layer-1 coordinates, following EQ. (6). The arguments show that the off-diagonal traces are backshifted by the one-way mode delay, whereas the 22-traces are backshifted by the two-way delay, (i.e., by twice as much). Subsequent layers may be stripped by an extension of these methods.

VSP Layer-Stripping (4C)

In the VSP context, those skilled in the art will recognize that the received signal from a 4-component (4C) VSP set-up or experiment (i.e., with the receiver aligned with the source coordinates) may be written as:

$$S_0(t_1+t_2)=R(-\theta_2)P_2 \otimes R(\theta_2-\theta_1)T^{12}P_1 \otimes R(\theta_1)s_0w(t)S_0 \qquad (EQ\ 18)$$

Assuming equal inline and crossline sources, and rotating to the principal axes of layer-1, this becomes:

$$S_1(t_1+t_2)=R(\theta_1-\theta_2)P_2 \otimes s_0w(t)T^{12}R(\theta_2-\theta_1) \otimes P_1 \qquad (EQ\ 19)$$

Layer-stripping, using only a single application (i.e., since the ray only travels down) of the mode-advance operator $D_1$, EQ. (19) becomes (cf. EQ. (9)):

$$S_1(t_1+t_2) \equiv S_1(t_1+t_2) \otimes D_1 \qquad (EQ\ 20)$$

$$= R(\theta_1-\theta_2)[P_2 \otimes s_0w(t)T^{12} \otimes A_1 \otimes \delta(t-t_1^f)]R(\theta_2-\theta_1) \qquad (EQ\ 21)$$

The quantity in square brackets is the layer-stripped principal time series:

$$s(t) = \qquad (EQ\ 22)$$

$$s_0 T^{12} A_1 \otimes \begin{bmatrix} A_2^f \otimes w(t - t_1^f - t_2^f) & 0 \\ 0 & A_2^s \otimes w(t - t_1^f - t_2^f - \Delta t_1) \end{bmatrix}$$

which may then be found by solving EQ. (21) as before:

$$s(t) = R(\theta_2 - \theta_1)S_1(t_1 + t_2)R(\theta_1 - \theta_2) \qquad (EQ\ 23)$$

In words the layer-stripped principal time-series is just the layer-stripped, re-rotated data. The recipe for layer-stripping is then:

$$S_1(t_1 + t_2) = \begin{bmatrix} S_{11}^1(t) & S_{12}^1(t - \Delta t_1) \\ S_{21}^1(t) & S_{22}^1(t - \Delta t_1) \end{bmatrix} \qquad (EQ\ 24)$$

On these matrix elements, the subscript "1" indicates that this is data which has been rotated into layer-1 coordinates, following EQ. (6). The arguments show that only the second column of this (rotated) data matrix is time-shifted. This recipe differs in detail from that of Winterstein and Meadow (See Winterstein, D. F., and M. A. Meadows, "Shear-wave polarizations and subsurface stress directions at Los Hills Field," Geophysics, 56(9), 1331–1348, and "Changes in heat-wave polarizations azimuth with depth in Cymric and Aairoad Gap Oil Fields", Geophysics, 56(9), 1331–1348 (1991) who also time-shifted the other off-diagonal trace. Their argument was presented heuristically, without derivation or modelling example.

We claim:

1. A method for evaluating surface reflected data over depth-variable azimuthally anisotropic layers of the earth including a shallowest layer located adjacent to the surface of the earth and at least two underlying layers, comprising the steps of:

i) acquiring a shear wave data stack from one of a set of multiple-sources and multiple-receivers, a single-source and multiple-receivers, and a set of multiple-sources and a single-receiver;

ii) rotating each trace of said shear wave data stack by a single angle corresponding to the difference in the orientation of said data stack and the direction of azimuthal anisotropy of a shallowest layer;

iii) localize the vertical variation in the direction of anisotropy in said layer;

iv) measuring the degree of azimuthal anisotropy of said layer;

v) perform layer-stripping of said data stack to obtain the principal time series of said layer, said layer-stripping including the steps of correcting the slow polarization traces of said data stack and the mixed polarization traces of said data stack for azimuthal anisotropy;

vi) rotating the data set formed by step (v) by a single angle that corresponds to the difference in the direction of azimuthal anisotropy of an underlying layer and the direction of azimuthal anisotropy of the overlying layer to identify the principle directions of the azimuthal anisotropy in said underlying layer; and vii) repeating steps (iii) through (vi) for at least one layer under said shallowest layer.

2. The method of claim 1, wherein said data set of step (vi) is a four component data set comprising: a component associated with an in-line source and an in-line receiver; a component associated with an in-line source and a cross-line receiver; a component associated with a cross-line source and an in-line receiver; and a component associated with a cross-line source and a cross-line receiver.

3. The method of claim 1, wherein step (iv) comprises the step of determining the total delay $\Delta t$ of the slow directionally polarized traces relative to the fast directionally polarized traces of said layer.

4. The method of claim 3, wherein step (v) comprises the steps of: shifting said slow directionally polarized traces of said data set backward in time by said delay $\Delta t$; and shifting said mixed directionally polarized traces by one-half of said delay.

5. The method of claim 4, wherein step (v) further comprises the step of muting the traces of said data set for times less than $t_{bot}$ where $t_{bot}$ corresponds to the bottom of said layer.

6. A method for processing surface reflected shear wave traces from a layered depth-variable azimuthally-anisotropic geological formation having a shallowest layer located adjacent to the surface of the earth and at least two underlying layers, comprising the steps of:

i) identifying the fast principal time series, the slow principal time series and the orientation of the azimuthal anisotropy of the shallowest layer;

ii) identifying the bottom of the layer;

iii) using said fast principal time series and said slow principal time series of step (i) to determine the degree of azimuthal anisotropy of the layer;

iv) taking the seismic components of the layer to form a multi-component data set;

v) correcting the slow directionally polarized traces of said data set for the effect of azimuthal anisotropy of the layer;

vi) correcting mixed directionally polarized traces of said data set for the effect of azimuthal anisotropy of the layer;

vii) muting the original traces of said data set for times less than that of the bottom of the layer viii) rotating the data set formed by step (vii) by a single angle that corresponds to the difference in the direction of azimuthal anisotropy of said subsequent layer and the direction of azimuthal anisotropy of the shallowest layer to identify the dominant fracture-set in said subsequent layer; and ix) repeating steps (i) through (viii) for another subsequent layer.

7. The method of claim 6, wherein step (iii) for each layer so processed comprises the step of determining the total delay $\Delta t$ of the slow principal time series relative to the fast principal time series of said layer.

8. The method of claim 7, wherein for each layer so processed step (v) comprises the step of shifting said slow directionally polarized traces of said data set backward in time by said delay $\Delta t$; and step (vi) comprises the step of shifting mixed directionally polarized traces by one-half of said delay.

9. The method of claim 6, wherein said data set of step (iv) is a four component data set comprising: a component associated with an in-line source and an in-line receiver; a component associated with an in-line source and a cross-line receiver; a component associated with a cross-line source and an in-line receiver; and a component associated with a cross-line source and a cross-line receiver.

10. A method of evaluating surface reflected data over depth-variable azimuthally anisotropic geological layers including a shallowest layer located at the earth's surface and two underlying layers, comprising the steps of:

i) acquiring along a survey line a shear wave data stack from the formations, said data stack comprising a plurality of seismic traces;

ii) using said data stack of step (i) to identify the angle between said survey line and the azimuth of the dominant fracture-set of a first layer and the bottom of said first layer;

iii) comparing the fast seismic shear traces and the slow seismic shear traces of said dominant fracture-set to obtain a measure of the total delay $\Delta t$ of the slow directionally polarized traces relative to the fast directionally polarized traces;

iv) copying the seismic components of said first layer to form a multi-component data set;

v) shifting said slow directionally polarized traces of said data set backward in time by said total delay $\Delta t$;

vi) shifting mis-matched directionally polarized traces of said data set backward in time by one-half of said total delay $\Delta t$;

vii) rotating said multi-component data set formed by step (vi) by an angle that corresponds to the difference in the direction of azimuthal anisotropy of said next layer and the direction of azimuthal anisotropy of said first layer to identify the orientation of the azimuthal anisotropy in said next layer; and viii) repeating steps (iii) through (vii) for the next layer under said first layer.

11. The method of claim 10, wherein the data stack of step (i) is acquired from one of a set of multiple-sources and multiple-receivers, a single-source and multiple-receivers, and multiple-sources and a single-receiver; and where in step (iv) said multi-component data set comprises: a component associated with an in-line source and an in-line receiver, a component associated with an in-line source and a cross-line receiver, a component associated with a cross-line source and an in-line receiver, and a component associated with a cross-line source and a cross-line receiver.

12. The method of claim 11, where in step (ii) said dominant fracture set is characterized by a fast principal time series and a slow principal time series; and wherein each said time series is obtained by rotating traces of said shear wave data stack by a single angle corresponding to the difference in the orientation of said data stack and the direction of azimuthal anisotropy of said layer.

13. The method of claim 10, where step (vii) comprises the step of muting the original traces of said data set for times less than that of the bottom of said layer.

14. The method of claim 10, further including the step of: obtaining a measure of, over the window formed by said next layer, the amplitude $A_o$ of the envelope of the fast polarization trace.

15. The method of claim 14, further including the steps of: rotating, by about 45 degrees away from the principal direction, the data set formed by step (viii); and obtaining a measure of, over said window, the amplitude $A_{45}$ of the envelope of at least one of the mixed/mismatched polarization traces of the rotated data set.

16. The method of claim 15, further including the step of forming the ratio of said measure of the amplitude $A_{45}$ of the envelope of one of the mixed/mismatched polarization traces to said measure of the amplitude $A_o$ of the envelope of the fast polarization trace to identify locations of fracturing.

17. The method of claim 15, further including the step of: normalizing said measure of the amplitude $A_{45}$ of at least one of the mixed/mismatched polarization traces by said measure of the amplitude $A_o$ of the fast polarization trace to identify locations of fracturing.

18. The method of claim 14, wherein said measure of the amplitude $A_o$ of the amplitude of the fast polarization trace is representative of its average over said window formed by said next layer.

19. A method of analyzing seismic surface reflected shear wave data to evaluate fracturing in the sub-surface, comprising the steps of:
(a) acquiring a surface reflected shear wave data stack comprising a plurality of seismic traces;
(b) stripping the shallowest layer where polarization changes are indicated by applying a static shift to data components of the data stack that are aligned with the slow shear wave polarization direction and by applying one half of said static shift to data components neither aligned with the slow shear wave polarization direction nor aligned with the fast shear wave polarization direction; and
(c) rotating the principal time series data elements that are below the shallowest layer by a single angle that corresponds to the difference in the direction of azimuthal anisotropy of the shallowest layer and the direction of azimuthal anisotropy of a next subsequent layer.

20. A seismic method for processing surface reflected data over relatively thin, depth-variable, azimuthally anisotropic layers, comprising the steps of:
i) acquiring a shear wave data stack from one of a set of multiple-sources and multiple-receivers, a single-source and multiple-receivers, and multiple-sources and a single-receiver, wherein said shear wave data stack comprises at least a four component data set including an in-line source component, an in-line receiver component, a cross-line source component, and a cross-line receiver component;
ii) rotating each component of said shear wave data stack by a single angle corresponding to the difference in the orientation of said data stack and the direction of azimuthal anisotropy of a shallowest layer;
iii) localize the vertical variation in the direction of anisotropy in said shallowest layer;
iv) measuring the degree of azimuthal anisotropy of said shallowest layer by determining the total delay $\Delta t$ of the slow directionally polarized traces relative to the fast directionally polarized traces of said layer;
v) perform layer-stripping of said data stack to obtain the principal time series of said shallowest layer, said layer-stripping including the step of correcting the slow polarization traces of said data stack and the mixed polarization traces of said data stack for azimuthal anisotropy by shifting said slow directionally polarized traces of said data set backward in time by said delay $\Delta t$, and by shifting mixed directionally polarized traces by one-half of said delay;
vi) repeating steps (iii) through (v) for a layer under said shallowest layer; and
vii) rotating the data set formed by step (vi) by a single angle that corresponds to the difference in the direction of azimuthal anisotropy of said underlying layer and the direction of azimuthal anisotropy of said shallowest layer to identify the principle directions of the azimuthal anisotropy in said underlying layer.

21. A method of analyzing surface reflected seismic shear wave data to evaluate changes in shear wave polarization with depth, comprising the steps of:
a) stripping from the data those layers where polarization changes are indicated by:
(i) identifying data components for each layer that are aligned with the slow shear wave polarization direction, data components aligned with the fast shear wave polarization direction and data components neither aligned with said slow or fast shear wave polarization directions;
(ii) determining the apparent time lags between the fast shear wave and the slow shear wave at the depth of each layer;
(iii) determining the natural polarization directions of said fast shear wave and said slow shear wave;
(iv) applying a static shift to data components aligned with the slow shear wave polarization direction;
(v) applying one half of said static shift to components neither aligned with the slow shear wave polarization direction nor aligned with the fast shear wave polarization direction to correct for azimuthal anisotropy; and
(vi) rotating, by an azimuth angle determined down to the shallowest depth where polarization changes are indicated, all of said data that are below said shallowest depth to identify the principle directions of azimuthal anisotropy in said shallowest layer;
b) obtaining, in at least one layer under said shallowest layer, a measure of the amplitude of the envelope of the fast polarization trace;
c) obtaining a measure of the amplitude of the envelope of at least one of the mixed/mismatched polarization traces to identify locations of fracturing; and
d) comparing the measures obtained in steps (b) and (c).

22. The method of claim 21, where in steps (b) and (c) said measure is the average of the amplitude; and wherein step (d) is performed by forming the ratio of said average of the amplitude of at least one of the mixed/mismatched polarization traces to said average of the amplitude of the envelope of the fast polarization trace.

23. The method of claim 21, wherein step (d) comprises the step of normalizing said measure of the amplitude of at least one of the mixed/mismatched polarization traces by said measure of the amplitude of the envelope of the fast polarization trace.

24. The method of claim 21, wherein said static shift is representative of the total delay $\Delta t$ of the slow directionally polarized traces relative to the fast directionally polarized traces of said layer.

25. In a method of analyzing a surface reflected seismic shear wave data set to evaluate changes in shear wave polarization with depth comprising the step of stripping layers where polarization changes are indicated by means of applying a static shift to data components aligned with a shear wave polarization direction to correct for azimuthal anisotropy, an improvement comprising the steps of:
   a) applying a static shift to data components aligned with the slow shear wave polarization direction; and
   b) applying one half of said static shift to data components neither aligned with the slow shear wave polarization direction nor aligned with the fast shear wave polarization direction, wherein said static shift is representative of the total delay of the slow directionally polarized traces relative to the fast directionally polarized traces of said layer.

26. The method of claim 25, further including the step of:
   c) rotating the principal time series data set by a single angle that corresponds to the difference in the direction of azimuthal anisotropy of the shallowest layer and the direction of azimuthal anisotropy of a subsequent layer.

27. The method of claim 26, wherein the shear wave data set was obtained over a plurality of depth-variable azimuthally anisotropic layers including at least one relatively thin coal bed; and further comprising the steps of:
   d) repeating steps (a) through (c) down to the level of said one coal bed;
   e) obtaining a measure of the amplitude of the envelope of the fast polarization data components of said coal bed;
   f) rotating, by about 45 degrees away from a principal direction, said data components of said coal bed;
   g) obtaining a measure of the amplitude of the envelope of one of the mixed/mismatched polarization data components of said coal bed; and
   h) using the ratio of said measure of the amplitude envelope of one of the mixed/mismatched polarization data components to said measure of the amplitude envelope of the fast polarization data components to evaluate fracturing in said coal bed.

28. A method of ascertaining fracture intensity by analyzing a surface reflected seismic shear wave data set that was obtained over a generally isotropic overburden and at least one relatively thin carbonaceous bed, the data set comprising mixed and matched data elements, comprising the steps of:
   a) obtaining a principal direction of the fast polarization data components of the carbonaceous bed;
   b) rotating, by about 45 degrees away from a principal direction, said data components of the carbonaceous bed; and
   c) obtaining a measure $A_{45}$ of the amplitude of the envelope of at least one of the mixed polarization data components of step (b).

29. The method of claim 28, further including the steps of: obtaining a measure $A_o$ of the amplitude of the envelope of said fast polarization data components of the carbonaceous bed, before doing step (b); and evaluating fracturing in the carbonaceous bed by forming the ratio of said measure of step (c) to said measure $A_o$ of the amplitude of the envelope of said fast polarization data components of the carbonaceous bed.

30. The method of claim 29, wherein the carbonaceous bed is a coal bed comprising a plurality of cleats; and further including the step of calibrating said ratio by Poisson's ratio for said coal bed and the cleat density of said coal bed.

31. The method of claim 30, wherein said cleats are characterized by circular cracks; and wherein said cleat density is a volumetric average of circular crack diameter.

32. The method of claim 30, wherein said cleats comprise butt cleats and face cleats, and wherein said cleat density is representative of the volume of face cleats.

33. A method of evaluating anisotropy in a carbonaceous sequence including an anisotropic overburden and at least one carbonaceous bed, comprising the steps of:
   a) acquiring a multi-component surface reflected seismic shear wave data set over the carbonaceous sequence;
   b) stripping the effect of the overburden by:
      identifying data components of said data set that are aligned with a slow shear wave polarization direction, data components that are aligned with a fast shear wave polarization direction, and mismatched data components that are neither aligned with said slow shear wave polarization direction or said fast shear wave polarization direction,
      determining the apparent time lags between the fast shear wave traces and the slow shear wave traces,
      determining the natural polarization directions of said fast shear wave traces and said slow shear wave traces,
      applying a static shift to data components aligned with the slow shear wave polarization direction,
      applying a fraction of said static shift to components neither aligned with the slow shear wave polarization direction nor aligned with the fast shear wave polarization direction to correct for azimuthal anisotropy in the overburden, and
      rotating, by an azimuth angle determined down to the shallowest depth where polarization changes are indicated above the carbonaceous bed, all of the data of said data set that are below said shallowest depth where polarization changes are indicated to establish the principle direction of anisotropy in the carbonaceous bed;
   c) obtaining a measure of the amplitude $A_o$ of the envelope of the fast polarization traces of the carbonaceous bed;
   d) rotating, by an acute angle away from said principle direction of anisotropy in the carbonaceous bed, all of the data of said data set that are below said shallowest depth where polarization changes are indicated;
   e) obtaining a measure of the amplitude $A_\theta$ of the envelope of at least one of the mixed/mismatched polarization traces of the carbonaceous bed; and
   f) obtaining a measure of the ratio of said measure of the amplitude $A_\theta$ of at least one of the mixed/mismatched polarization traces to said measure of the amplitude $A_o$ of the envelope of the fast polarization traces.

34. The method of claim 33, wherein the carbonaceous bed is a coal bed comprising a plurality of cleats; and further including the step of calibrating said ratio of step (f) by measurements of Poisson's ratio for the coal bed and the cleat density of the coal bed.

35. The method of claim 34, wherein said cleats are characterized by circular cracks; and wherein said cleat density is representative of the volume of circular cracks.

36. The method of claim 34, wherein said cleats comprise butt cleats and face cleats, and wherein said cleat density is representative of the volume of face cleats.

37. The method of claim 33, where in step (d) said acute angle is between 30 and 60 degrees.

38. The method of claim 37, where in step (d) said acute angle is 45 degrees.

39. The method of claim 33, where in step (c) said measure of the amplitude $A_o$ of the envelope of the fast polarization traces of said carbonaceous bed is representative of its average.

40. The method of claim 33, where in step (e) said measure of the amplitude $A_\theta$ of the envelope of at least one of the mixed/mismatched polarization traces of said carbonaceous bed is representative of its average.

41. The method of claim 33, where step (b) comprises the step of muting the components of said data set for times less than the bottom of the overburden.

42. The method of claim 33, where in step (b) said fraction of said static shift is between ⅜-ths and ⅝-ths of said static shift.

43. The method of claim 42, where in step (b) said fraction of said static shift is one-half of said static shift.

44. A method of using a multi-component surface reflected seismic shear wave data set that was obtained over the coal bed sequence to evaluate fracturing in the coal beds sequence, comprising the steps of:

a) rotating, by an azimuth angle determined down to the shallowest depth where polarization changes are indicated above a coal bed, all of the data of said data set that are below said shallowest depth where polarization changes are indicated to establish the principle direction of anisotropy in said coal bed;

b) obtaining a measure of the average of the amplitude of the envelope of the fast polarization traces of said coal bed of step (a);

c) rotating, by about 45 degrees away from said principle direction of anisotropy in said coal bed, all of the data of said data set that are below said shallowest depth where polarization changes are indicated;

d) obtaining a measure of the average of the amplitude of the envelope of at least one of the mixed/mismatched polarization traces of said coal bed of step (c); and e) obtaining the ratio of said measure of the amplitude of at least one of the mixed/mismatched polarization traces to said measure of the amplitude of the envelope of the fast polarization traces.

45. The method of claim 44, wherein the sequence of coal beds comprises an anisotropic overburden; and wherein prior to performing step (a) the effect of said overburden is stripped from said data set down to the level of a coal bed.

46. The method of claim 45, wherein the effect of said overburden is stripped from said data set by:

identifying data components aligned with a slow shear wave polarization direction, data components aligned with a fast shear wave polarization direction and mismatched data components that are neither aligned with said slow shear wave polarization direction or said fast shear wave polarization direction, determining the apparent time lags between the fast shear wave traces and the slow shear wave traces, determining the natural polarization directions of said fast shear wave traces and said slow shear wave traces, applying a static shift to data components aligned with the slow shear wave polarization direction;

applying about one-half of said static shift to components neither aligned with the slow shear wave polarization direction nor aligned with the fast shear wave polarization direction to correct for azimuthal anisotropy in the overburden; and muting the components of said data set for times less than the bottom of the overburden.

47. The method of claim 44, wherein said coal bed of step (a) comprises a plurality of butt cleats and face cleats; and further including the step of calibrating said ratio as a function of at least one of Poisson's ratio for said coal bed and the volume density of said face cleats located therein.

48. A method of evaluating surface reflected seismic data over depth-variable azimuthally anisotropic layers of the earth, comprising the steps of:

i) acquiring at least a two component shear wave data stack from the layers, said data stack comprising a plurality of seismic traces;

ii) using said data stack of step (i) to identify the fast principal time series, the slow principal time series, and the orientation of azimuthal anisotropy of a layer, including the shallowest layer;

iii) identifying the bottom of the layer of step (ii);

iv) using said fast principal time series and said slow principal time series of step (ii) to determine the degree of azimuthal anisotropy of the layer of step (iii);

v) copying the seismic components of the layer to form a multi-component data set;

vi) correcting the slow directionally polarized traces of said data set for the effect of azimuthal anisotropy of the layer;

vii) muting the original traces of said data set for times less than that of the bottom of the layer as determined in step (iii);

viii) using the dataset formed by step (vii) to identify the fast principal time series, the slow principal time series, and the orientation of the azimuthal anisotropy of a subsequent layer; and ix) repeating steps (ii) through (viii) for said subsequent layer.

49. The method of claim 48, where in step (i) said data stack is obtained relative to a survey line; and step (ii) is performed by rotating said at least two-component data set by an angle that corresponds to the difference between the direction of said survey line and said orientation of azimuthal anisotropy of said layer.

50. The method of claim 49, wherein step (iv) comprises the step of determining a measure of the total delay $\Delta t$ of the slow principal time series relative to the fast principal time series of the layer.

51. The method of claim 50, wherein step (vi) comprises the steps of shifting said slow principal time series backward in time by said delay $\Delta t$, and correcting said traces by angle-dependent scaling.

* * * * *

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

Figure 16C:
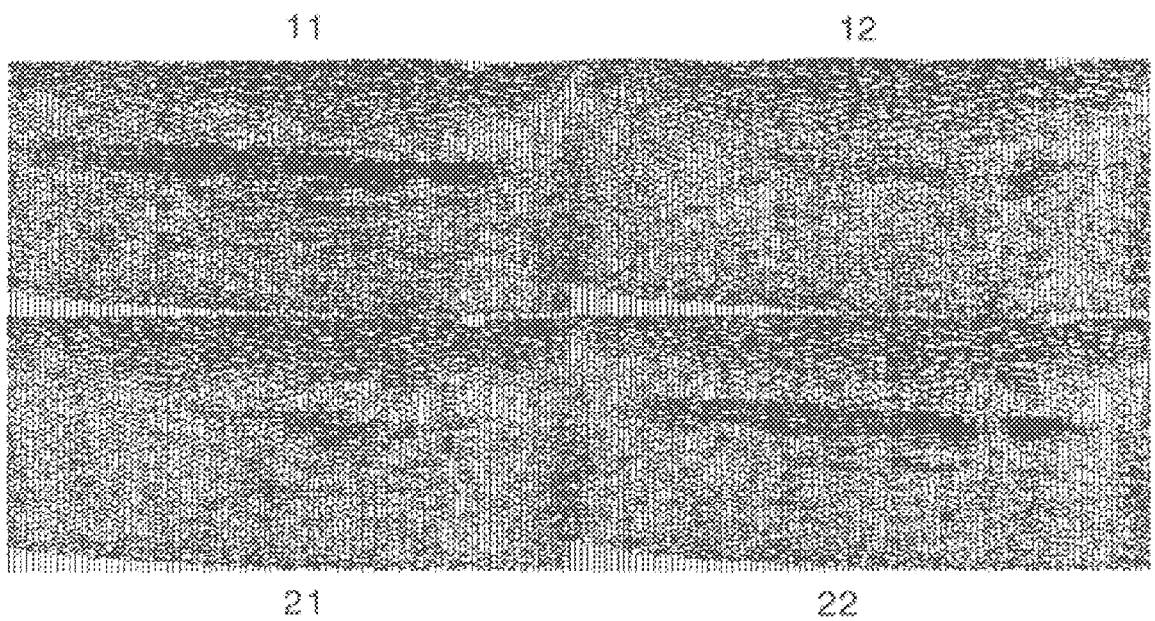

It is certified that error appears in the above-identified patent and that said Letters Patent is hereby corrected as shown below:

In the drawings,
On Sheet 5 of 5, after Figure 16c, add the following drawing of Figure A:

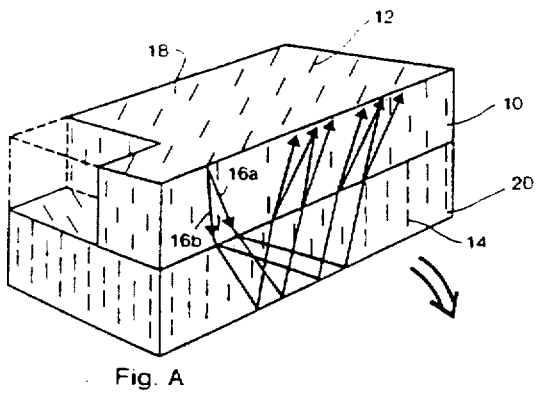

Fig. A

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

On Sheet 5 of 5, after Figure 16c and after insertion of Figure A, add the following drawing of Figure B:

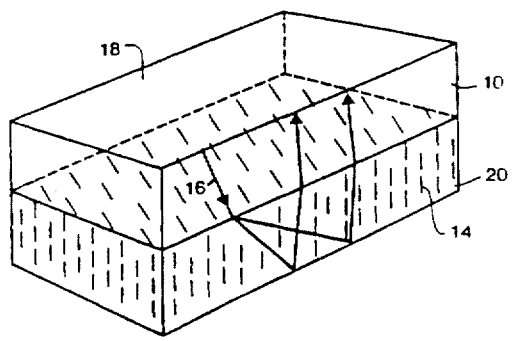

Fig. B

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line | |
|---|---|---|
| 3 | 36 | "greater than $V^{195}$," should read --greater than $V^{\perp}$,-- |
| 4 | 21 | "*Geoph.*, 5, (3)," should read --*Geoph.*, 53, (3),-- |
| 5 | 24 | "*Geoph.*, 5, (3)," should read --*Geoph.*, 53, (3),-- |
| 7 | 7 | "stack by asingle angle" should read --stack by a single angle-- |
| 14 | 40 | "CBM" should read --CBS-- |

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line | |
|------|------|---|
| 15 | 16 | "484-487 (1995)"<br>should read --305-308 (1995)-- |
| 15 | 67 | "anisotropic effects o are to be"<br>should read --anisotropic effects only are to be-- |
| 17 | 43 | "trade also tell us"<br>should read --trace also tell us-- |
| 20 | 3 | "Anisotand and Coal Bed"<br>should read --Anisotropy and Coal Bed-- |
| 20 | 4 | "pp. 315-388"<br>should read --pp. 305-388-- |

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line |  |
|---|---|---|
| 21 | 29 | "711-1995"<br>should read --711-728, 1995-- |
| 23 | 1 | "set name` (root)"<br>should read --set name (root)-- |
| 23 | 50 | "while (vv <=$ea"<br>should read --while (vv <=$ea)-- |
| 24 | 23-26 | each instance of "-N$NM.R"+"0$vv."<br>should read ---N$NM.R"+"$vv.-- |
| 24 | 47 | "@vv+$VV+$da"<br>should read --@vv+$vv+$da-- |

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line |  |
|---|---|---|
| 25 | 24-25 | "$S_O(2t_1+2t_2)=2R(-\theta_1)P_1 \otimes T^{21}R(\theta_1-\theta_2)P_2 \otimes RP_2 \otimes R(\theta_2-\theta_1)T^{12}P_1 \otimes R(\theta_1)s_0w(t)S_O$" should read --$S_O(2t_1+2t_2)=2\mathbf{R}(-\theta_1)\mathbf{P}_1 \otimes \boldsymbol{T}^{21}\mathbf{R}(\theta_1-\theta_2)\mathbf{P}_2 \otimes \boldsymbol{RP}_2 \otimes \mathbf{R}(\theta_2-\theta_1)\boldsymbol{T}^{12}\mathbf{P}_1 \otimes \mathbf{R}(\theta_1)s_0w(t)S_O$-- |
| 25 | 29 | "$S_O(2t_1+2t_2)$" should read --$\mathbf{S}_O(2t_1+2t_2)$-- |
| 25 | 49 | "$S_O$ without arguments" should read --$\mathbf{S}_O$ without arguments-- |

UNITED STATES PATENT AND TRADEMARK OFFICE
CERTIFICATE OF CORRECTION

PATENT NO.: 5,835,452                                    Page 7 of 16
DATED: November 10, 1998
INVENTOR(S): Michael C. Mueller, Leon Thomsen, Ilya Tsvankin It is certified that error appears in the above-identified patent and that said Letters Patent is hereby corrected as shown below:

| Col. | Line | |
|------|------|---|
| 26 | 4 | "$P_1 = \begin{bmatrix} A_1{}^f \delta(t - t_1^f) & 0 \\ 0 & A_1{}^s \delta(t - t_1^s) \end{bmatrix}$" should read -- $P_1 = \begin{bmatrix} A_1^f \otimes \delta(t - t_1^f) & 0 \\ 0 & A_1^s \otimes \delta(t - t_1^s) \end{bmatrix}$ -- |
| 26 | 8 | "$A_1{}^f$" should read -- $A_1^f$ -- |
| 26 | 11 | "$t_1^f = Z_1 / V_1^f$" should read -- $t_1^f = Z_1 / V_1^f$ -- |

UNITED STATES PATENT AND TRADEMARK OFFICE
CERTIFICATE OF CORRECTION

PATENT NO.: 5,835,452
DATED: November 10, 1998
INVENTOR(S): Michael C. Mueller, Leon Thomsen, Ilya Tsvankin It is certified that error appears in the above-identified patent and that said Letters Patent is hereby corrected as shown below:

| Col. | Line | |
|---|---|---|
| 26 | 12 | "$A_1^s$ and $t_1^s$" should read --$A_1^s$ and $t_1^s$-- |
| 26 | 15 | "$T^2$" should read --$T^{12}$-- |
| 26 | 22 | "$P_1 = \begin{bmatrix} A_2^f \otimes \delta(t-t_2^f) & 0 \\ 0 & A_2^s \otimes \delta(t-t_2^s) \end{bmatrix}$" should read --$P_1 = \begin{bmatrix} A_2^f \otimes \delta(t-t_2^f) & 0 \\ 0 & A_2^s \otimes \delta(t-t_2^s) \end{bmatrix}$-- |

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line |  |
|---|---|---|
| 26 | 30-31 | "(e.g., $R(\theta_2-\theta_1), R(-\theta_1)$, etc.)" should read --(e.g., $\mathbf{R}(\theta_2-\theta_1), \mathbf{R}(-\theta_1)$, etc.)-- |
| 26 | 35 | "Operating on $S_o$" should read --Operating on $\mathbf{S}_o$-- |
| 26 | 35 | "the left with $R(\theta)_1$" should read --the left with $\mathbf{R}(\theta)_1$-- |
| 26 | 36 | "the right with $R(\theta)_1$" should read --the right with $\mathbf{R}(\theta)_1$-- |

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line | |
|---|---|---|
| 26 | 45 | "= $P_1R(\theta_1-\theta_2)P_2 \otimes 2T^{21}Rs_Ow(t)T^{12} \cdot P_2 \cdot R(\theta_2-\theta_1)P_1$" should read -- = $P_1R(\theta_1-\theta_2)P_2 \otimes 2T^{21}Rs_Ow(t)T^{12} \otimes P_2 \otimes R(\theta_2-\theta_1)P_1$ -- |
| 27 | 5 | "the right with $D_1$" should read --the right with $\mathbf{D_1}$-- |
| 27 | 12 | "application of $D_1$" should read --application of $\mathbf{D_1}$-- |
| 27 | 15 | "$S_1(2t_1+2t_2) \equiv D_1 \otimes S_1(2t_1+2t_2) \otimes D_1$" should read --$\mathbf{S_1}(2t_1+2t_2) \equiv \mathbf{D_1} \otimes \mathbf{S_1}(2t_1+2t_2) \otimes \mathbf{D_1}$-- |

UNITED STATES PATENT AND TRADEMARK OFFICE
CERTIFICATE OF CORRECTION

PATENT NO.: 5,835,452
DATED: November 10, 1998
INVENTOR(S): Michael C. Mueller, Leon Thomsen, Ilya Tsvankin It is certified that error appears in the above-identified patent and that said Letters Patent is hereby corrected as shown below:

| Col. | Line |
|------|------|
| 27   | 20   |

"$S_1(2t_1 + 2t_2) = A_1 \otimes \delta(t - t_1^f) R(\theta_1 - \theta_2) \otimes P_2 \otimes 2T^{21} Rs_O \, w(t) T^{12} \otimes P_2 \otimes R(\theta_2 - \theta_1) \delta(t - t_1^f) \otimes A_1$"

should read

-- $\mathbf{S}_1(2t_1 + 2t_2) = A_1 \otimes \delta(t - t_1^f) \mathbf{R}(\theta_1 - \theta_2) \otimes \mathbf{P}_2 \otimes 2T^{21} \mathbf{R}s_O \, w(t) T^{12} \otimes \mathbf{P}_2 \otimes \mathbf{R}(\theta_2 - \theta_1) \delta(t - t_1^f) \otimes A_1$ --

| Col. | Line |
|------|------|
| 27   | 24   |

"$= R(\theta_1 - \theta_2)\left[ A_1 \otimes \delta\left(t - t_1^f\right) \otimes P_2 \otimes 2T^{21} Rs_0 w(t) T^{12} \otimes P_2 \otimes \delta\left(t - t_1^f\right) \otimes A_1 \right] R(\theta_2 - \theta_1)$"

should read

-- $= \mathbf{R}(\theta_1 - \theta_2)\left[ A_1 \otimes \delta\left(t - t_1^f\right) \otimes \mathbf{P}_2 \otimes 2T^{21} \mathbf{R}s_0 w(t) T^{12} \otimes \mathbf{P}_2 \otimes \delta\left(t - t_1^f\right) \otimes A_1 \right] \mathbf{R}(\theta_2 - \theta_1)$ --

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line |
|------|------|
| 27   | 32   |

"$= 2s_0 T^{21} T^{12} A_1 \otimes R \begin{bmatrix} A_2^f \otimes w(t - 2t_1^f - 2t_2^f) & 0 \\ 0 & A_2^s \otimes w(t - 2t_1^f - 2t_2^f - 2\Delta t_1) \end{bmatrix}$"

should read $-- = 2s_0 T^{21} T^{12} A_1 \otimes R \begin{bmatrix} A_2^f \otimes w(t - 2t_1^f - 2t_2^f) & 0 \\ 0 & A_2^s \otimes w(t - 2t_1^f - 2t_2^f - 2\Delta t_1) \end{bmatrix} --$

UNITED STATES PATENT AND TRADEMARK OFFICE
CERTIFICATE OF CORRECTION

PATENT NO.: 5,835,452
DATED: November 10, 1998
INVENTOR(S): Michael C. Mueller, Leon Thomsen, Ilya Tsvankin It is certified that error appears in the above-identified patent and that said Letters Patent is hereby corrected as shown below:

| Col. | Line |
|------|------|
| 27 | 40 |

"$s(t) = R(\theta_2 - \theta_1)S_1(2t_1 + 2t_2)R(\theta_1 - \theta_2)$" should read
-- $\mathbf{s}(t) = \mathbf{R}(\theta_2 - \theta_1)\mathbf{S}_1(2t_1 + 2t_2)\mathbf{R}(\theta_1 - \theta_2)$ --

"$S_0(t_1 + t_2) = R(-\theta_2)P_2 \otimes R(\theta_2 - \theta_1)T^{12}P_1 \otimes R(\theta_1)s_0 w(t)S_0$" should read
-- $\mathbf{S}_0(t_1 + t_2) = \mathbf{R}(-\theta_2)\mathbf{P}_2 \otimes \mathbf{R}(\theta_2 - \theta_1)T^{12}\mathbf{P}_1 \otimes \mathbf{R}(\theta_1)s_0 w(t)\mathbf{S}_0$ --

| Col. | Line |
|------|------|
| 28 | 5 |

"$S_1(t_1 + t_2) = R(\theta_1 - \theta_2)P_2 \otimes s_0 w(t)T^{12}R(\theta_2 - \theta_1) \otimes P_1$" should read
-- $\mathbf{S}_1(t_1 + t_2) = \mathbf{R}(\theta_1 - \theta_2)\mathbf{P}_2 \otimes s_0 w(t)T^{12}\mathbf{R}(\theta_2 - \theta_1) \otimes \mathbf{P}_1$ --

UNITED STATES PATENT AND TRADEMARK OFFICE
CERTIFICATE OF CORRECTION

PATENT NO.: 5,835,452
DATED: November 10, 1998
INVENTOR(S): Michael C. Mueller, Leon Thomsen, Ilya Tsvankin It is certified that error appears in the above-identified patent and that said Letters Patent is hereby corrected as shown below:

| Col. | Line | | |
|---|---|---|---|
| 28 | 9 | "mode-advance operator $D_1$," | should read --mode-advance operator $\mathbf{D}_1$,-- |
| 28 | 12 | "$S_1(t_1 + t_2) \cong S_1(t_1 + t_2) \otimes D_1$" | should read --$\mathbf{S}_1(\mathbf{t}_1 + \mathbf{t}_2) \equiv \mathbf{S}_1(\mathbf{t}_1 + \mathbf{t}_2) \otimes \mathbf{D}_1$-- |
| 28 | 14 | "$= R(\theta_1 - \theta_2)\left[P_2 \otimes s_0 w(t) T^{12} \otimes A_1 \otimes \delta(t - t_1^f)\right] R(\theta_2 - \theta_1)$" | should read --$= \mathbf{R}(\theta_1 - \theta_2)\left[\mathbf{P}_2 \otimes \mathbf{s}_0 w(t) \mathbf{T}^{12} \otimes \mathbf{A}_1 \otimes \delta(t - t_1^f)\right] \mathbf{R}(\theta_2 - \theta_1)$-- |

UNITED STATES PATENT AND TRADEMARK OFFICE
CERTIFICATE OF CORRECTION

PATENT NO.: 5,835,452

DATED: November 10, 1998

INVENTOR(S): Michael C. Mueller, Leon Thomsen, Ilya Tsvankin

It is certified that error appears in the above-identified patent and that said Letters Patent is hereby corrected as shown below:

| Col. | Line |
|------|------|
| 28 | 22 |

$$"s_0 T^{12} A_1 \otimes \begin{bmatrix} A_2{}^f \otimes w(t - t_1{}^f - t_2{}^f) & 0 \\ 0 & A_2 s_\otimes w(t - t_1{}^f - t_2{}^f - \Delta t_1) \end{bmatrix}"$$

should read $$-- \mathbf{s}_0 T^{12} \mathbf{A}_1 \otimes \begin{bmatrix} A_2^f \otimes w(t - t_1^f - t_2^f) & 0 \\ 0 & A_2^s \otimes w(t - t_1^f - t_1^f - \Delta t_1) \end{bmatrix} --$$

| 28 | 28 |

"$s(t) = R(\theta_2 - \theta_1) S_1(t_1 + t_2) R(\theta_1 - \theta_2)$"   should read -- $\mathbf{s}(t) = \mathbf{R}(\theta_2 - \theta_1) \mathbf{S}_1(t_1 + t_2) \mathbf{R}(\theta_1 - \theta_2)$ --

UNITED STATES PATENT AND TRADEMARK OFFICE
CERTIFICATE OF CORRECTION

PATENT NO.: 5,835,452
DATED: November 10, 1998
INVENTOR(S): Michael C. Mueller, Leon Thomsen, Ilya Tsvankin It is certified that error appears in the above-identified patent and that said Letters Patent is hereby corrected as shown below:

| Col. | Line | | |
|------|------|---|---|
| 29 | 63 | "iv) taking the seismic" should read --iv) copying the seismic-- | |
| 29 | 63 | "of the layer to form" should read --of the layer and forming-- | |
| 30 | 48 | "iv) copying the seismic" should read --iv) using the seismic-- | |

Signed and Sealed this

Fifteenth Day of June, 1999

Attest:

Attesting Officer

Q. TODD DICKINSON

Acting Commissioner of Patents and Trademarks